(12) United States Patent
Menard et al.

(10) Patent No.: US 7,237,023 B2
(45) Date of Patent: Jun. 26, 2007

(54) SYSTEM AND METHOD FOR CORRELATING AND DIAGNOSING SYSTEM COMPONENT PERFORMANCE DATA

(75) Inventors: Cody Menard, Houston, TX (US); Raghavendra K. Murthy, Austin, TX (US)

(73) Assignee: Tonic Software, Inc., Lindon, UT (US)

( * ) Notice: Subject to any disclaimer, the term of this patent is extended or adjusted under 35 U.S.C. 154(b) by 815 days.

(21) Appl. No.: 10/063,232

(22) Filed: Apr. 2, 2002

(65) Prior Publication Data

US 2002/0184065 A1    Dec. 5, 2002

Related U.S. Application Data

(63) Continuation-in-part of application No. 09/681,419, filed on Mar. 30, 2001.

(51) Int. Cl.
*G06F 11/34* (2006.01)
(52) U.S. Cl. .......................... 709/224; 709/223; 714/47
(58) Field of Classification Search ................ 709/223, 709/224, 203; 714/47
See application file for complete search history.

(56) References Cited

U.S. PATENT DOCUMENTS

| | | | |
|---|---|---|---|
| 5,764,897 A | 6/1998 | Khalidi | |
| 5,958,010 A | 9/1999 | Agarwal et al. | |
| 5,958,012 A * | 9/1999 | Battat et al. ................. | 709/224 |
| 5,974,457 A * | 10/1999 | Waclawsky et al. ......... | 709/224 |
| 6,021,437 A * | 2/2000 | Chen et al. .................. | 709/224 |
| 6,115,693 A | 9/2000 | McDonough et al. | |
| 6,125,391 A * | 9/2000 | Meltzer et al. .............. | 709/223 |
| 6,138,157 A | 10/2000 | Welter et al. | |
| 6,144,961 A | 11/2000 | de la Salle | |
| 6,167,538 A * | 12/2000 | Neufeld et al. ................ | 714/47 |
| 6,195,697 B1 | 2/2001 | Bowman-Amuah .......... | 709/224 |
| 6,317,786 B1 * | 11/2001 | Yamane et al. .............. | 709/224 |
| 6,345,239 B1 | 2/2002 | Bowman-Amuah ............ | 703/6 |
| 6,405,327 B1 * | 6/2002 | Sipple et al. .................. | 714/39 |
| 6,446,123 B1 * | 9/2002 | Ballantine et al. ........... | 709/224 |

(Continued)

OTHER PUBLICATIONS

Marina Thottan et al.; Adaptive Thresholding for Proactive Network Problem Detection; Proceedings of the IEEE Third International Workshop on Systems Management; pp. 108-116; Apr. 24, 1998.*

*Primary Examiner*—Kenneth R. Coulter
(74) *Attorney, Agent, or Firm*—AdvantEdge Law Group, LLC

(57) ABSTRACT

The system and method for correlating, predicting and diagnosing system component performance data includes capturing knowledge about system behavior, deploying the captured knowledge as baseline system behavior files, evaluating system performance data against the baseline system behavior files, performing predictive and diagnostic analysis when received system performance data exceeds thresholds in the baseline system behavior files, and notifying a user when an analysis result is generated. The method of capturing knowledge about system behavior includes defining problems to be solved, creating datasets that correspond to defined problems, constructing problem scenarios, associating data patterns modules with the problem scenarios, and generating XML definition files that characterize system behavior in terms of the scenarios, modules, and datasets. The system has the capability to activate corrective scripts in the target system and to reconfigure the target system.

40 Claims, 17 Drawing Sheets

U.S. PATENT DOCUMENTS

| | | | |
|---|---|---|---|
| 6,643,613 B2 * | 11/2003 | McGee et al. | 702/186 |
| 6,738,798 B1 * | 5/2004 | Ploetz et al. | 709/203 |
| 6,754,664 B1 * | 6/2004 | Bush | 707/102 |
| 6,892,317 B1 * | 5/2005 | Sampath et al. | 714/4 |
| 6,983,320 B1 * | 1/2006 | Thomas et al. | 709/224 |
| 2003/0139905 A1 * | 7/2003 | Helsper et al. | 702/182 |

* cited by examiner

700

```
1000
                                    1010
<DomainDef Type="OS"                 ╮
        Category="Operating System">  ╯      1020
        <ComponentDef Type="Cache"    ─────────╯
                VicinityImpact="host"
                Cardinality="unique"                1030
                Aggregate="false">                   ╯
                <DataPointDef Name="HitRatio"  ──────
                        Unit="%"
                        ArchiveValues="false"
                        HistoricalValues="100"
                        DataType="int">
                        <IntMap3 Threshold1="90"
                                Threshold2="75"
                                Threshold3="50"/>       1040
                </DataPointDef>                          ╯
        </ComponentDef>
        <ComponentDef Type="Configuration" ──────
                VicinityImpact="host"
                Cardinality="unique"                  1050
                Aggregate="false">                     ╯
                <DataPointDef Name="DefaultGateway" ─────
                        ArchiveValues="false"
                        HistoricalValues="100"
                                                      1060
                        DataType="string">             ╯
                </DataPointDef>
                <DataPointDef Name="DHCPserver"  ──────
                        ArchiveValues="false"
                        HistoricalValues="100"
                        DataType="string">
                </DataPointDef>
                                                        1070
                        .                                ╯
                        .
                        .
                <DataPointDef Name="Utilization"  ──────
                        Unit="%"
                        ArchiveValues="false"
                        HistoricalValues="100"
                        DataType="int">
                        <IntMap3 Threshold1="75"
                                Threshold2="85"
                                Threshold3="95"/>
                </DataPointDef>
        </ComponentDef>
</DomainDef>
```

FIG. 10

1110
```
<DataSetDef Name="Oracle_SqlRuntimeDiagnostic" Priority="1"
                Category="Performance">
    <DsComponentDef DomainType="Oracle"
                CompType="Long_Running_Sql">
        <DsDataPointDef DpName="Duration"
                Output="false"
                Trigger="true"
                TriggerThreshold="CRITICAL"
                Analyze="true"/>
        <DsDataPointDef DpName="LastTimeRun"
                Output="false"
                Trigger="false"
                Analyze="false"/>
        <DsDataPointDef DpName="SqlStatement"
                Output="false"
                Trigger="false"
                Analyze="false"/>
    </DsComponentDef>
    <DsModuleDef Name="Oracle_SqlRuntimeDiagnostic"
                Engine="kbengine"/>
</DataSetDef>
```

1140
```
<DataSetDef Name="OS_FileSysDiskSpacePredictor" Priority="1"
                Category="">
    <DsComponentDef DomainType="OS" CompType="FileSystem">
        <DsDataPointDef DpName="Used"
                Analyze="true"
                TriggerThreshold="WARNING"
                Trigger="true"/>
    </DsComponentDef>
    <DsModuleDef Name="OS_FileSysDiskSpacePredictor"
                Engine="kbengine"/>
</DataSetDef>
```

1170
```
<DataSetDef Name="OS_VirtMemoryPredictor" Priority="1"
                Category="">
    <DsComponentDef DomainType="OS" CompType="VirtMemory">
        <DsDataPointDef DpName="Utilization"
                Analyze="true"
                TriggerThreshold="WARNING"
                Trigger="true"/>
    </DsComponentDef>
    <DsModuleDef Name="OS_VirtMemoryPredictor"
                Engine="kbengine"/>
</DataSetDef>
```

```
            <Scenario ScenarioId="82"
                OwnerDomainType="OS"
                ActionDomainType="OS"
1210            ActionComponentType="FileSystem"
                AffectedArea="OS File System"
1230            Category="Availability"
                Severity="2"
                Statement="File system space is approaching capacity
        on [OS.getHost()] : [OS.FileSystem.getCompName()]">
                    <ShortText>Delete unneccessary files or extend
        the file system.</ShortText>
                    <LongText>Add additional disk space.</LongText>
                    <Description>Application performance could be
        affected.

The file system [OS.getHost()] : [OS.FileSystem.getCompName()]
        is projected to run out of space in [OS.getTimeLeft()]
        minutes.</Description>
                    <cvFlag Name="Displayable"/>
                    <cvFlag Name="Notifyable"/>
            </Scenario>
            <Scenario ScenarioId="146"                                              1200
                OwnerDomainType="OS"
1220            ActionDomainType="OS"
                ActionComponentType="VirtMemory"
                AffectedArea="OS Virtual Memory"
1240            Category="Performance"
                Severity="3"
                Statement="Virtual Memory is approaching capacity on
        host [OS.VirtMemory.Utilization.getHost()]">
                    <ShortText>Configure additional virtual memory.
        You may have to add additional disk space to accomplish
        this.</ShortText>
                    <LongText></LongText>
                    <Description>Application performance will be
        affected.

Host [OS.VirtMemory.Utilization.getHost()] is projected to run
        out of virtual memory in [OS.getTimeLeft()]
        minutes.</Description>
                    <cvFlag Name="Displayable"/>
                    <cvFlag Name="Notifyable"/>
            </Scenario>
```

<RelationTemp Tag="BroadVision_55.AggrDaemon.Oracle.Table._1_1"
   Type="autocreated"
   OwnerDomainType="BroadVision_55"
   OwnerCompType="AggrDaemon"
   MemberDomainType="Oracle"
   MemberCompType="Table"
   OwnerComp="mr_pmthdlr_d[a-zA-Z1-9]*"
   MemberComp="MR_ORDERS"
/>

1320

<RelationTemp Tag="BroadVision_55.AggrDaemon.Oracle.Table._2_1"
   Type="autocreated"
   OwnerDomainType="BroadVision_55"
   OwnerCompType="AggrDaemon"
   MemberDomainType="Oracle"
   MemberCompType="Table"
   OwnerComp="mr_pmtsettle_d[a-zA-Z1-9]*"
   MemberComp="MR_ORDERS"
/>

```
<Engine Name="kbengine" Type="cvAllEvents"/>
<ModuleDef Name="OS_FileSysDiskSpacePredictor"
        Engine="kbengine"
        Library="OS"
        TriggerDataSet="true"
        TriggerResult="false"
        TriggerDataPoint="false"
        Type="keSinglePredict"
        ScenarioIds="OS.82"
        stability="3"
        maxTime="100"
        historySize="20"
        Description="File System Disk Space">
        <Flag Name="TriggerOnThreshold"/>
        <Flag Name="Notifyable"/>
        <Flag Name="Displayable"/>
</ModuleDef>
<ModuleDef Name="OS_VirtMemoryPredictor"
        Engine="kbengine"
        Library="OS"
        TriggerDataSet="true"
        TriggerResult="false"
        TriggerDataPoint="false"
        Type="keSinglePredict"
        ScenarioIds="OS.146"
        stability="3"
        maxTime="100"
        historySize="20"
        Description="Virtual Memory">
        <Flag Name="TriggerOnThreshold"/>
        <Flag Name="Notifyable"/>
        <Flag Name="Displayable"/>
</ModuleDef>
```

SYSTEM AND METHOD FOR CORRELATING AND DIAGNOSING SYSTEM COMPONENT PERFORMANCE DATA

CROSS REFERENCE TO RELATED APPLICATIONS

This application is a continuation-in-part of U.S. patent application Ser. No. 09/681,419 filed on Mar. 30, 2001.

BACKGROUND OF THE INVENTION

This invention relates generally to ensuring business system performance, and more particularly, to correlating and diagnosing performance data collected from components of business systems to achieve information technology goals and business objectives.

In the developing years of business use of electronic systems, business systems were used primarily for accounting and records keeping functions. As these systems grew in capability and features, business managers began to make use of these capabilities and features in new ways to improve business performance. With the widespread acceptance and use of the Internet for conducting on-line commercial and consumer transactions, these business systems have become increasingly complex and geographically distributed. At the same time, there developed increasing demand for higher performance and increased reliability or "uptime" to satisfy these business needs. This has put greater emphasis and visibility on the role of the information technology (IT) infrastructure of e-commerce businesses, and the people that support these systems. Concurrently, there has developed a trend whereby business managers have a need to play a more active role in IT infrastructure decision-making.

Conducting business over the Internet has created many new challenges that are difficult to manage using conventional approaches. Companies with activities that rely on e-commerce struggle to find solutions that will assist with managing increasingly complex infrastructure while satisfying a more demanding customer base. In particular, downtime costs can have a substantial impact on the gross revenues of an e-commerce organization, as well as losses due to brand erosion and customer dissatisfaction. As these companies become increasingly dependent upon e-Business as a significant source of revenue, the success of the overall business is inextricably linked to the health of the IT infrastructure. The lack of tools to communicate critical information concerning the condition of the IT infrastructure to business managers further complicates this picture. A further complexity is that many e-commerce systems are widely distributed over a large geographic area, where a principle means of communications between parts of the system is via the Internet.

Businesses are further faced with the problem of translating IT organization performance goals into objectives that satisfy the needs of the business. While there is a need for a reliable, high performance infrastructure for executing business processes, there is often a lack of understanding of the impact that systems, applications, and process execution breakdowns have on business objectives, because of the inability to measure IT performance against business objectives. Regarding reliability and performance, existing management tools for heterogeneous and complex business processes offer incomplete and inadequate coverage of individual infrastructure elements. There is a lack of a systems management solution that encompasses the entire execution infrastructure as a single entity, capturing the interrelations between systems, applications, and business processes. A solution must be capable of automatically adapting to constant changes in this execution environment.

It is often difficult for IT organizations to relate the impact of process execution breakdowns to business objectives. Since infrastructure failures are viewed as isolated IT events, the impact on the business is noticed only when a product line manager or analyst sees a change in business performance. A solution is needed that will capture the business process workflows and relate potential and actual infrastructure breakdowns to business process execution, enabling IT and business managers to find a collaborative solution. It is desirable to have a solution that is capable of expediting and automating the remediation process.

IT contributions to the core business are often measured using IT-oriented metrics, rather than metrics that support IT contributions to business goals or corporate strategy. A solution is needed that reports IT performance in terms of business metrics rather than infrastructure performance. By combining business and IT metrics, information may be generated that will enable business decisions to be made based on a correlation of IT performance and business goals.

This environment has created a need for a unified solution for monitoring the health of real-time e-business infrastructures to improve the quality, reliability and total cost of ownership of e-business sites. This translates to the bottom line as greater customer satisfaction, a loyal customer base, and increased revenues. It is therefore an object of the present invention to provide a comprehensive solution for correlating collected performance data to detect and identify incipient and immediate system component failures in complex e-business infrastructures.

Another object of the present invention is to enable improved performance of e-commerce systems by diagnosing patterns in collected component performance data to determine a cause of a system component performance reduction in e-business.

Yet another object of the present invention is to provide real-time correlation, prediction and diagnosis of collected performance data from e-commerce system components for evaluating, reporting, and managing e-commerce system configuration, providing predictive and impact analysis, and reducing downtime by detecting incipient failures before there is a significant impact of business performance.

SUMMARY OF THE INVENTION

The present invention satisfies the needs for transaction monitoring and infrastructure management of modern business systems by capturing and representing expert knowledge about infrastructure components, and monitoring their behavior. Infrastructure component data is extracted by collectors from applications, operating systems and databases before being analyzed and correlated to detect, predict and diagnose the cause of execution failures. Correlation of the infrastructure component data enables users to associate and analyze data from a wide variety of sources in a simple unifying format. This provides the capability to capture relationships and correlate data from multiple systems in real time. Root cause analysis is performed by correlating and diagnosing the collected data.

In a typical scenario, a plurality of data collectors gathers relevant data about an e-business application, a database, and various web servers. This data is sent to a management system server and analyzed by a reasoning system within the server. Examples of anomalies that may occur include a web server or application server timeout, an application server error, or a database space problem. When an anomaly is detected, the reasoning system performs predictive analysis and diagnostics that determine the specific component contributing to the problem and the server system manager notifies the administrator of an actual or incipient problem, its cause, and its impacts. This process enables the management system server to pinpoint the specific cause of a problem in real-time.

The data collectors are small, individual collectors that capture data reflecting the real-time health and performance of the applications and underlying IT components in the e-business environment. These collectors deliver data to the management server where it is aggregated and analyzed. The system manager records the data in a repository and evaluates it against predefined threshold values. If any of the datapoints violates threshold values, the reasoning system is triggered to perform analysis.

An embodiment of the present invention is a computer-implemented method for correlating and diagnosing system performance data that comprises capturing knowledge about system behavior, deploying the captured knowledge as baseline system behavior files, evaluating monitored system performance datapoints against the baseline system behavior files to identify datasets that have changed states, performing real-time prediction and diagnostic analysis on the datasets that have changed states, and notifying a user of a prediction and diagnostic analysis result. The capturing step may comprise defining problems to be solved, creating datasets that correspond to the defined problems, constructing problem scenarios, associating data patterns with the problem scenario cases, and generating XML definition files that characterize system behavior in terms of the scenarios, modules and datasets. The deploying step may further comprise characterizing the captured system behavior knowledge as XML files. The deploying step may comprise loading XML definition files that characterize system behavior in terms of the scenarios, modules and datasets, receiving system domain, component and datapoint information, creating relationships between components, and evaluating and creating domain and component instances in each domain to form instances of datasets. The evaluating step may comprise receiving system performance datapoints from data collectors, comparing the datapoints against a threshold value to determine a state of the datapoints, analyzing the received performance datapoints when a state changes or exceeds a threshold, correlating the datapoints that exceeded the threshold values with stored datasets in the baseline system behavior files to identify datasets, and sending the correlated related datasets to a reasoning system for prediction and diagnostic analysis. The performing step may comprise receiving correlated datasets by a reasoning system, performing prediction and diagnosis analysis by the reasoning system to determine if the received datasets match problem patterns in a knowledge base, and generating an analysis result based on analysis of the received datasets and problem patterns. The generating step may provide an analysis result that identifies a problem and a probable cause of the problem. The generating step may provide an analysis result that predicts an incipient system component failure. The generating step may provide a best estimate of a problem and probable cause of the problem. The evaluating step may comprise parsing XML files into a tree representation, traversing the tree representation and taking actions on specific tree elements, creating and updating domain, component, datapoint, relationship and dataset objects specified by a given tree element, instantiating derived objects by processing newly created components to determine if new relationships need to be created, and instantiating datasets by processing newly created relationships and components to determine if new datasets need to be instantiated. An embodiment of the present invention may be a computer-readable medium containing instructions for controlling a computer system to carry out the steps described above.

Another embodiment of the present invention is a computer readable medium containing a data structure for storing objects for correlating and diagnosing system component performance data that comprises domain objects that identify distinct areas of a system environment, component objects that identify parts of the domains of the system environment, datapoint objects that identify monitored characteristics of system components, dataset objects that comprise logical collections of datapoint objects, relationship templates for connecting two or more components related to one another, scenario objects that identify possible causes for a problem, and module objects that encapsulate stored knowledge. A system manager may instantiates the objects in a repository from XML files. The domain objects may be defined by DomainDef XML definition structures that include a type, category, and attributes of component and datapoint objects, the component objects may be defined by ComponentDef XML definition structures that include a type and attributes of datapoint objects, the datapoint objects may be defined by DataPointDef XML definition structures that contain a name and attributes, the dataset objects may be defined by DataSetDef XML definition structures that include attributes of components objects and datapoint objects, the relationship templates may be defined by RelationTemp definition structures that include identification of related components, the scenario objects may be defined by the Scenario definition structures that include the problem description, probable cause and suggested solutions, and the module objects may encapsulate knowledge. Domain objects may comprise one or more component objects, component objects may comprise one or more datapoint objects, and dataset objects may comprise one or more component objects and one or more datapoint objects. Dataset objects may contain datapoints belonging to one or more component objects. The DataSetDef objects may comprise a DataSetDef name, a list of DsComponentDef objects, each object may include a pointer to the component definition used in the dataset, a subset of DsDataPointDef objects included in the component definitions needed in the dataset, a list of child DsComponentDef objects related to this component, a parent DsComponentDef object, the DsDataPointDef objects may include a pointer to a DataPointDef object used in the dataset, a trigger flag for specifying whether this datapoint triggers analysis, a trigger threshold at which point analysis is triggered, an analyze flag for specifying whether this datapoint participates in analysis, and a label to uniquely identify the datapoint. The trigger threshold may be selected from the group consisting of good, fair, warning and critical. The DsComponentDef object may further include a constraint selected from the group consisting of possible candidates for this component based on its host, the domain instance, and the component instance. The relationship templates may specify a rule to create relationships between components, the relationship template may include the following attributes: Type for identifying method of creation, OwnerDomainType for identifying owner domain type, OwnerCompType for identifying owner component type, MemberDomainType for identifying member domain type, MemberCompType for identifying member component type, OwnerComp for identifying owner component instances, MemberComp for identifying member component instances, OwnerDomainInst for identifying owner domain instances, MemberDomainInst for identifying member domain instances, and flags to specify that owner and member should be part of the same domain, same component and same host. The data structure may further comprise an engine template for associating analysis with a dataset, the engine including one or more modules that address a specific dataset.

Another embodiment of the present invention is a computer-implemented system for correlating and diagnosing system performance data that comprises an extension environment comprising means for capturing knowledge about system behavior, a system manager that comprises means for deploying the captured knowledge as baseline system behavior files, means for evaluating monitored system performance datapoints against the baseline system behavior files to identify datapoints that have changed states, a reasoning system that comprises means for performing real-time prediction and diagnostic analysis on the datasets, and means for notifying a user of a prediction and diagnostic analysis result. The capturing means may comprise problems to be solved, datasets that correspond to the defined problems, problem scenarios, data pattern modules with the problem scenarios, and XML definition files that characterize system behavior in terms of the scenarios, modules and datasets. The means for deploying may further comprises XML files that characterize the captured system behavior knowledge. The system behavior knowledge may be stored in a repository, encapsulated in XML files and built into the engine and module. The means for deploying may comprise XML definition files that characterize system composition and behavior in terms of the scenarios, modules and datasets, domain information, datapoints and components, and relationships between components. The means for evaluating may comprise system performance data from data collectors, domain, component, datapoint and relationship instances from received data, relationships based on pre-defined templates based on component instances, datasets based on relationships and component instances, evaluated performance data to determine if a threshold value is exceeded, identified datasets containing datapoints that exceed a threshold value, and a reasoning system for receiving the identified datasets. The means for performing real-time prediction and diagnostic analysis may comprises a reasoning system for receiving identified datasets, a prediction engine and a diagnostic engine in the reasoning system for determining if the received dataset matches a problem pattern in a knowledge base, and an analysis result from the prediction engine and diagnostic engine. The analysis result may identify a problem, a probable cause of the problem, and a suggested solution. The analysis result may predict an incipient system component failure. The analysis result may be a best estimate of a problem and a probable cause of the problem.

Yet another embodiment of the present invention is a method for correlating and diagnosing system performance data that comprises entering knowledge about system behavior data into a repository, receiving system performance data from a target system, comparing the system performance data values with system behavior data values in the persistent store to determine if threshold values have been exceeded, indicating a problem, correlating the performance data that exceeds threshold values with datasets in a repository to identify related datasets, performing predictive and diagnostic analysis of the identified datasets, and notifying a user of a result of the performing predictive and diagnostic analysis step. The system behavior data and the system performance data may be stored in the persistent store. The performing step may further comprise analyzing the identified datasets with stored problem scenario datasets to determine a cause and correction for the data values that exceed threshold values. The method may further comprise activating a corrective script based on a result of the performing predictive and diagnostic analysis step. Another embodiment of the present invention is a computer-readable medium containing instructions for controlling a computer system to carry out the steps described above.

BRIEF DESCRIPTION OF THE DRAWINGS

These and other features, aspects, and advantages of the present invention will become understood with regard to the following description, appended claims, and accompanying drawings where:

FIG. 10 shows an example of a DomainDef definition object for an operating system;

FIG. 11A-FIG. 11C show examples of DataSetDef definition files;

FIG. 12 shows an example of a scenario definition file;

FIG. 13 shows an example of a relationship template;

FIG. 14 shows an example of an engine definition file;

DETAILED DESCRIPTION

Figure 1:
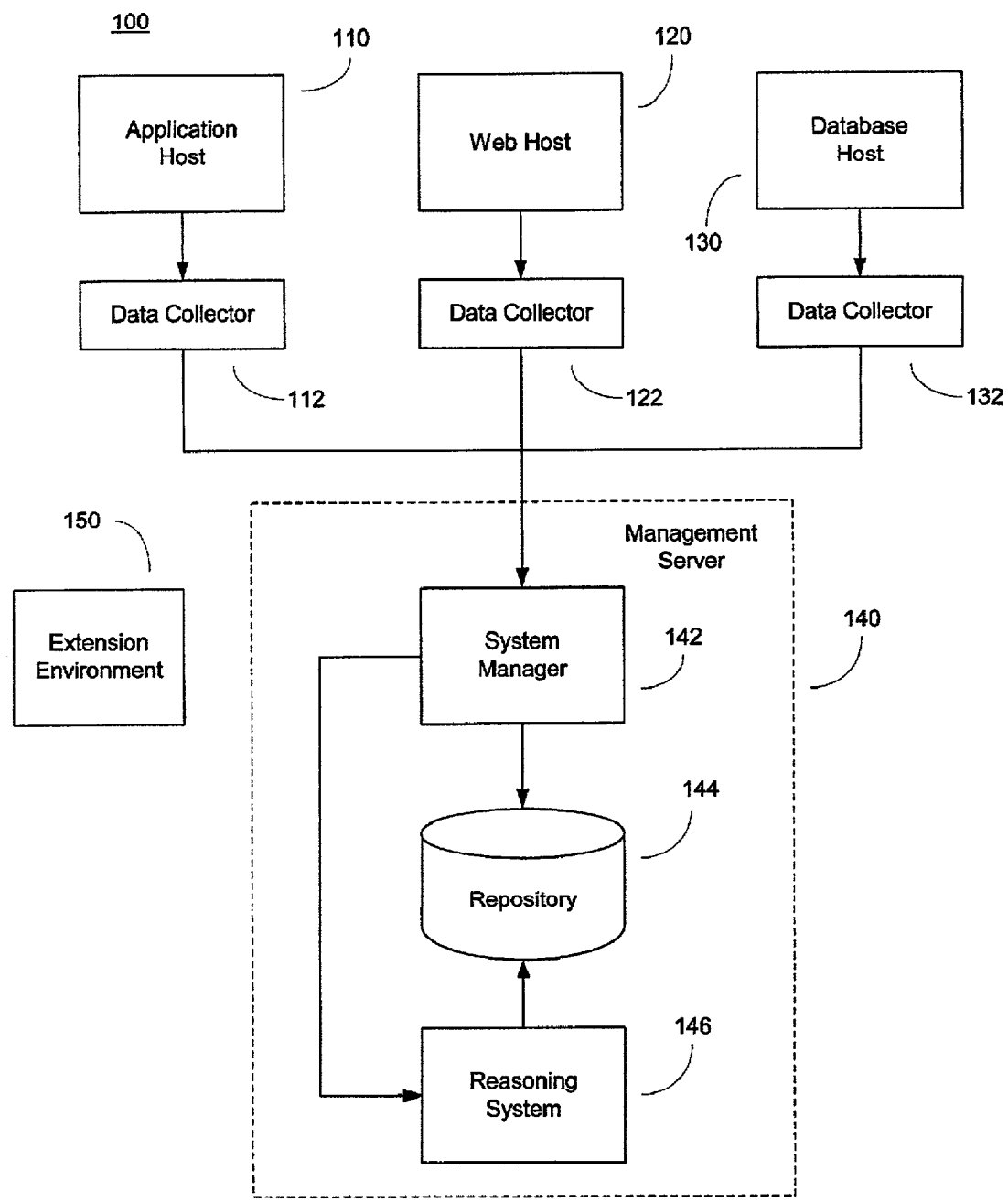
FIG. 1 shows a system block diagram of data collectors and a management server.

Turning now to FIG. 1, FIG. 1 shows a system block diagram 100 of data collectors 112, 122, 132 and a management server 140. The collectors 112, 122, 132 are comprised of the core collector technology and plug-ins that are specific to particular applications or infrastructure components. The system comprises an extensive library of existing collector plug-ins for leading e-business applications, application servers, web servers, databases, and operating systems that can be deployed in an environment as is. The management server 140 is the control center of an e-business applications management system, and is controlled by the system manager 142. When data is collected by the data collectors 112, 122, 132, it is delivered to the management server 140 where it is evaluated against threshold values to determine if further analysis is required. The system manager 142 records the received data in the repository 144 and evaluates it against predefined threshold values. If threshold values are exceeded by datapoints, the system manager 142 performs correlation to determine which datasets are affected by the datapoint that exceeded a threshold and notifies the reasoning system 146. To reduce network traffic and maintain efficiency, individual collectors 112, 122, 132 typically only transmit data when the values of the datapoints have changed. The repository 144 stores relevant data, problem scenarios, recommendations, and system configurations. The reasoning system 146 contains predictive analysis and diagnostic engines required to turn the repository's correlated data and templates into usable information. These predictive analysis and diagnostic engines are integral to system's ability to rapidly resolve problems. The reasoning system 146 evaluates the datapoints in relationship to one another. If the reasoning system 146 identifies a pattern that implies a problem, it performs diagnosis and recommends a resolution using the knowledge stored in the repository 144. As new data arrives at the management server 140, the system manager 142 determines if analysis by the reasoning system 146 is required. The system manager 142 records the new datapoints in the repository 144 and performs preliminary inspection of the data. It then populates these datasets with the real-time values of the datapoints. If any of the datapoints violate their predefined threshold values, the system manager 142 triggers the reasoning system 146 to perform analysis. During data analysis, the reasoning system 146 calls upon the repository 144 to locate all of the datasets involving the datapoints that have violated their threshold values. If the reasoning system 146 recognizes a problematic pattern, it draws upon the knowledge stored in the repository 144. By combining its built-in analytic intelligence with the repository's knowledge, the reasoning system 146 identifies the root cause of problems, and determines the area of the application system environment that is or will be affected by the situation. The repository 146 also contains in-depth intelligence of e-business technologies and their relationships with one another, as well as problem-solving expertise and historical records. The reasoning system 146 draws upon the information stored in the repository 144 in order to perform data correlation and analysis. Knowledge of the applications and underlying components, including their interdependencies, is represented in the repository 144 as object models. Also shown in FIG. 1 is an extension environment 150 that enables a user to initialize a management system by defining problem areas and creating scenario, module and dataset definitions.

The reasoning system 146 is comprised of a diagnostic engine and a predictive analysis engine. The diagnostic engine can identify patterns in collected data, which allow it to determine the state of the system or a problem that may be present. To accomplish this, the system manager organizes the data into datasets, each of which contain specific datapoints. The system manager stores datasets in a repository. A datapoint describes a specific attribute of a component, such as CPU utilization and available disk space. A dataset is a group of datapoints with a certain value range, For example, a dataset may contain a datapoint for CPU utilization that has a "warning value, indicating that the CPU is almost fully utilized. When the reasoning system submits a dataset to the diagnostic engine for analysis, the diagnostic engine retrieves the dataset from the repository, examines the patterns in the data, and matches these patterns with information in its knowledge base that best describes the current state, potential problems, or existing problems. If the diagnostic engine finds an anomaly, it determines the probable cause or condition and generates an analysis result that may be viewed using a GUI. Each analysis result describes the problem or condition, its severity, the date and time of occurrence, and short and long-term solutions, if applicable. Problems or conditions can trigger notifications to individuals or groups of individuals, and corrective action script to remedy the problem or condition.

The predictive analysis engine analyzes collected data over time to discover trends in a host business system. Predictive analysis discovers trends in degrading performance and potential system failures. When the predictive analysis engine diagnosis a problem or condition, it analyzes datapoint values over time to determine trends in system resources and business processes. If the predictive analysis engine detects a trend, it produces and sends an analysis result to a GUI. The analysis result may be a graph that displays the values of a datapoint or datapoints over time. Predictive analysis estimates the time available until resources are depleted or until a failure occurs, warning the user in advance to enable correction of the problem or condition.

Figure 2:
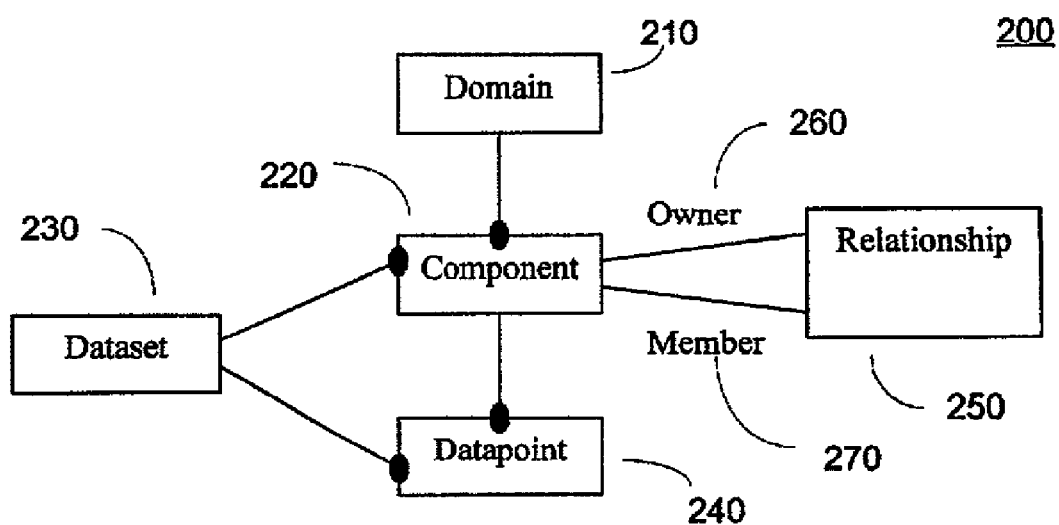
FIG. 2 shows a representation of an object model according to an embodiment of the present invention.

Turning now to FIG. 2, FIG. 2 shows a representation of an object model 200 according to an embodiment of the present invention. The present invention is a complete object-oriented system. The System Manager and other server elements instantiate data objects representing business applications, databases, and operating system resources that are stored in an Object Oriented Database Management System (OODBMS). Using XML representations, the System Manager and other server components instantiate these objects in the Repository. The methodology defines a very efficient data model 200 that allows multiple engines to use the same data. The system captures the definition of business processes through workflow models that encapsulate every step of their execution. It captures the characteristics of applications, systems, and databases in object models representing each element of the execution infrastructure. Interdependencies among applications, databases, and operating system platforms are captured in relationship object models that bind the entire execution infrastructure. These object models are instantiated at the Management Server at runtime and are stored in the Repository. The stored information is called data objects.

A domain 210, shown in FIG. 2, is the highest-level class that the system manages. Domains 210 may be associated with a Web server, operating system, database, and business application. A domain 210 groups related components 220. When a data collector plug-in starts, it submits its domain name, which specifically identifies the data collector plug-in. A component 220 is a part of a domain 210 in which data is being tracked. For example, a file system, system process, and log file are all components. In the data model 200, components 220 are modeled as a group of datapoints 240 belonging to the same area, performing a common function, or sharing common attributes. Each domain 210 contains one or more components 220, and a component 220 has a type and one or more instances. The type represents the overall category of the component object, while an instance consists of a specific case within that category. For example, a file system is a type of component on a Windows NT server, while the C drive is an instance of the file system component. FIG. 2 depicts a component 220 belonging to a domain210. A domain 210 may contain one or more components 220. Datapoints 240 are the monitored characteristics of components 220 or component instances. File system datapoints might include total disk space, amount of free space, and amount of used space on the disk. Associated with each datapoint 240 is a unique definable metric, or unit of measure, whose value identifies a specific aspect or characteristic of the component 220. Data collector plug-ins extract the values of datapoints 240 from the host machines. Datapoints 240 typically store real values. For example, CPU utilization is expressed as a percentage. The analysis engines diagnose problems and conditions and make predictions based on the threshold values for datapoints 240. For example, if the datapoint 240 measures CPU utilization, the thresholds determine whether CPU utilization is low ( good), medium (fair), high (warning), or very high (critical). This distinction is important in data analysis because it determines how the condition is diagnosed. If a datapoint 240 reaches a threshold, the System Manager triggers analysis. FIG. 2 depicts a datapoint 240 belonging to a component 220. A component 220 may contain one or more datapoints 240. Datasets 230 are logical collections of datapoints 240 stored within the Repository. The datapoints 240 in each dataset 230 can belong to any number of components 220, and any number of datasets 230 can contain the same datapoint 240. The groupings are based on various types of relationships 250 between the datapoints 240. For example, because database function is affected when a file system runs low on space, a dataset 230 might group datapoints 240 that monitor file system space within a domain 210, plus datapoints 240 that monitor Oracle database activity in the same domain 210. Each dataset 230 represents an attribute that the Reasoning System uses for analysis. In order to compare the states of several datapoints 240 without knowing the actual values of the datapoints 240, datasets 230 use normalized values. FIG. 2 depicts a datapoint 240 containing multiple components 220 and datapoints 240.

Also shown in FIG. 2 is how relationships 250 connect two or more components 220 as being, belonging, or working together. Components 220 often have relationships 250 with one another; for example, a word processing application may depend on the printer connected to a particular host in order to print, and therefore establishes a relationship 250. The relationship 250 between components 220 is very important when creating individual datasets 230. When building a list of associated datapoints 240, the server looks for these relationships 250. For example, if the printer and spooler are related to each other and there is a dataset 230 that contains datapoints 240 from both, only datapoints 240 from the related printer and spooler are used. This is crucial to the problem determination that is based on this relationship 250. If the printer is down, only the spooler that is associated with the printer is affected. The System Manager instantiates datasets 230 based on relationships 250. As the System Manager collects, stores, and analyzes data from a target system, the Management Server checks for relationships 250 that exist between the various elements of the business enterprise. Relationships 250 are the dependencies, interactions, and working associations among the domains 210 and component 220 instances that are being monitored. For example, there is a relationship between an Oracle tablespace and the file system on a database server. Due to its dependency on the file system, Oracle operates less efficiently as the disk space on the host server begins to diminish. If the host server runs out of disk space, Oracle becomes inefficient or could fail. FIG. 2 depicts an owner-member relationship 250 between two components 220. The relationship 250 holds the association between an owner component 220 and member component 220. The system uses relationships 250 to organize associated datapoints 240. A relationship 250 exists when one component 220 relies on another component 220 in order to function. The data collector plug-ins use these types of relationships 250 to determine what data to extract. The data collector plug-ins normally extract relationship data during configuration and initialization, rather than during the normal collection interval. In other words, the data collector plug-ins typically send data about relationships 250 only when something has changed (is re-configured) and when the system starts. FIG. 13 below shows an example of a relationship template.

Figure 3:
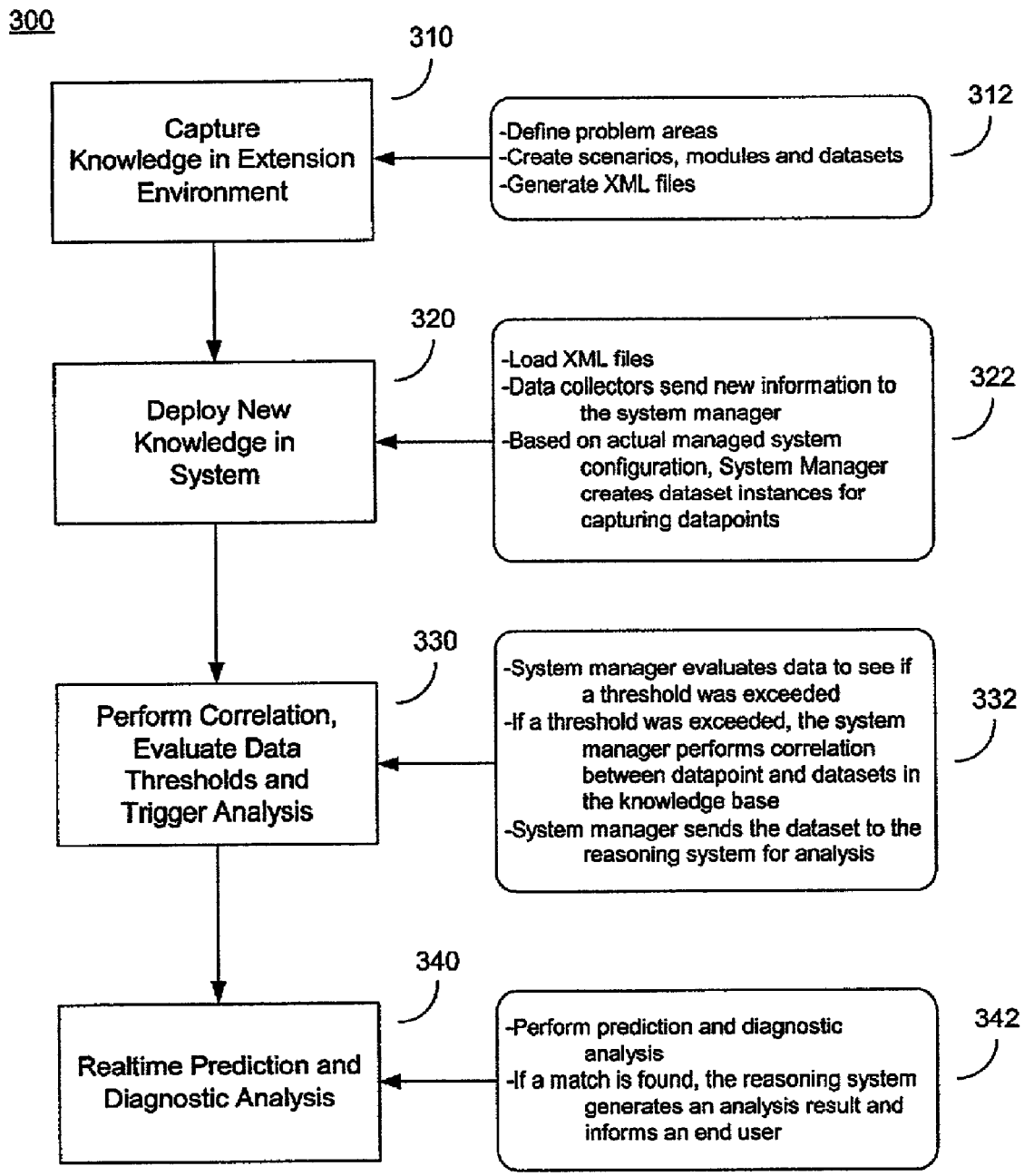
FIG. 3 shows a flow diagram of the system process.

Turning now to FIG. 3, FIG. 3 shows a flow diagram 300 of the system process. The management server correlates data in real time from systems throughout the environment. This enables the management server to accurately and immediately determine the root cause of a problem and provide the user with detailed information about the source of the communication problem. In order to determine the cause of a problem, the management server needs a definition of the application, problem scenarios that might occur in that application, and the data patterns that pinpoint each scenario. The process consists of the steps of using an extension environment for modeling the technology to be managed for capturing knowledge 310, deploying new knowledge in a management server 320 at run-time, performing data correlation and evaluating data thresholds and triggering analysis in real-time by the system manager 330, and prediction and diagnostic analysis of the data by the reasoning system 340. The capture knowledge step 310 further comprises sub-steps 312 discussed below in relation to FIG. 4, the deploy new knowledge step 320 further comprises sub-steps 322 discussed below, the evaluate step 330 further comprises sub-steps 332 discussed below, and the analysis step 240 further comprises sub-steps 342 discussed below.

Figure 4:
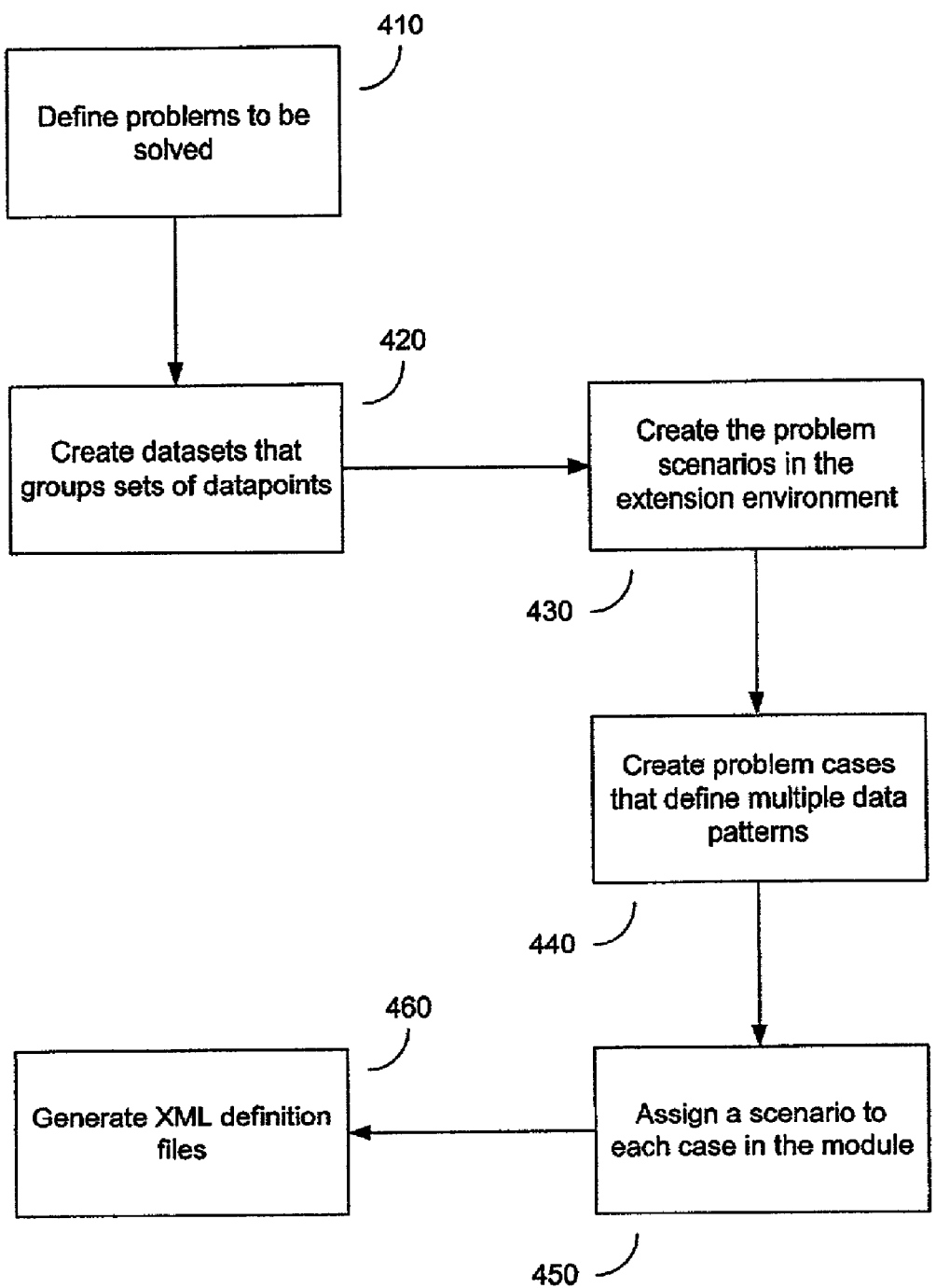
FIG. 4 shows the sub-steps of the capture knowledge step of FIG. 3.

Turning now to FIG. 4, FIG. 4 shows the sub-steps 400 of the capture knowledge step 310 of FIG. 3. The capture knowledge step 310 in FIG. 3 comprises defining the problems to be solved 410. This step is performed by the extension environment. Then a dataset is created that groups a set of datapoints 420, further comprising the steps of creating problem scenarios in the extension environment 430, creating problem cases that define multiple data patterns 440, and assigning a scenario to each case in the module 450. XML definition files are then generated 460 that correspond to the data patterns.

Figures 5A, 5B:
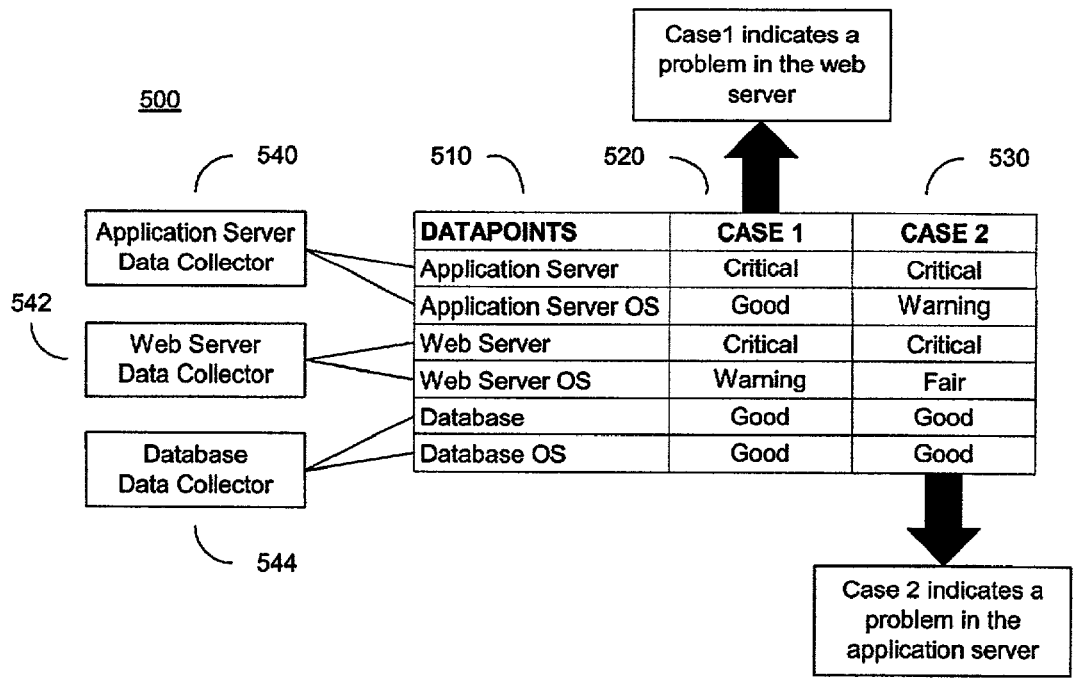
FIG. 5A-5B shows examples of correlating dataset patterns for problem determination.

Turning now to FIG. 5A, FIG. 5A shows an example 500 of the ability of the present invention to capture and understand the relationships between technologies in the e-business infrastructure for the purpose of correlating data and diagnosing the root cause of problems quickly. Relationships are defined as the interdependencies between technologies in executing a business process or completing tasks. In the example 500, in an e-commerce environment, in order for a web page to be delivered, the web server must pass the request on to an application server, which gathers the page content from a database. The invention relies on data collectors 540, 542, 544 to for collecting datapoints 510 to track the relationships between the web server and application server and the database, as well as the relationships between these technologies and their underlying operating systems. These relationships enable a Reasoning System in a Management Server, which contains powerful analysis engines, to correlate data from multiple systems in real time. This is accomplished through the use of datasets which are groupings of specific datapoints 510 that are established based on the relationships between systems. The datasets serve as templates, in which the actual datapoint values are inserted before analysis takes place. Analysis is performed using instances of datasets that were created by the System Manager. When data collectors 540, 542, 544 collect data from a live environment, the datapoints 510 carry values that correspond to different performance levels or "states". Supported states are good, fair, warning, or critical, depending upon predefined threshold values. During analysis, the datapoints 510 populate a given dataset in real time, thereby creating cases 520, 530 with their values (for example, good-warning-critical, or critical-critical-critical). These cases 520, 530 indicate certain conditions or problems exist within the environment. In the present example, case 1 may indicate a problem in a web server while case 2 may indicate a problem in an application server.

Turning to FIG. 5B, FIG. 5B shows an example of relationships 550 between cases 570, 580 assigned to a specific scenario 590. Datasets are associated with problem scenarios. If the datapoint values 560 match a case 570, 580 in a dataset, the system returns an analysis result for the corresponding scenario 590. This analysis result describes the problem and how to resolve it. In the example 550, case 1 570 is assigned case #203 and case 2 580 is assigned case #252. This example illustrates how data correlation is a prerequisite necessary for the invention to truly diagnose the root cause of problems.

Figure 6:
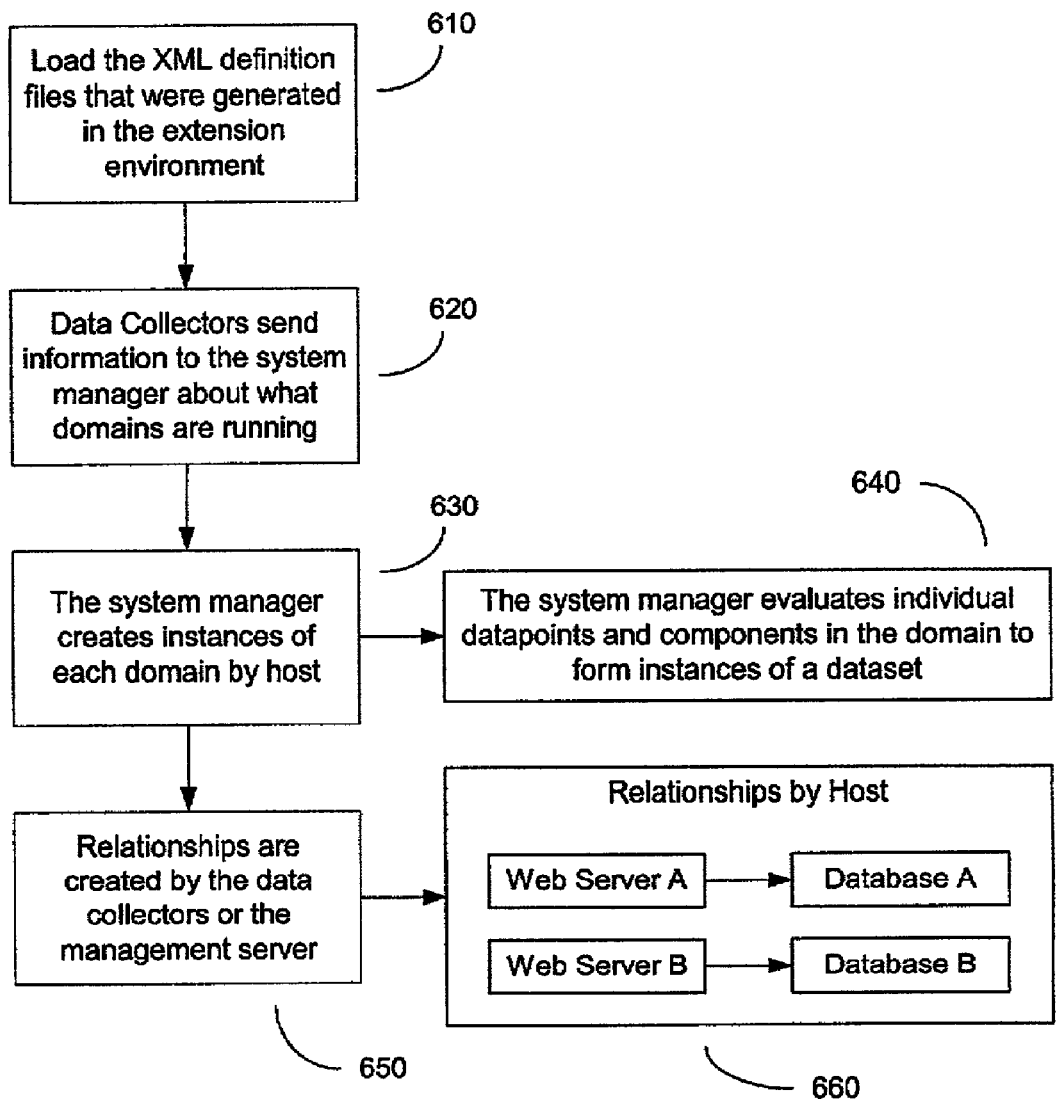
FIG. 6 shows the sub-steps of the deploy new knowledge step of FIG. 3.

Turning now to FIG. 6, FIG. 6 shows the sub-steps 600 of the deploy new knowledge step 320 of FIG. 3. When new knowledge has been created in the extension environment, it is represented as XML definition files that must be loaded into the Management Server run-time environment 610. This knowledge may include information about a new e-business application, application server, web server, database, or operating system. Each of these software applications is a domain. In addition, new problem scenarios, modules, and datasets may be deployed. The data collectors collect and send domain information to the System Manager 620. The System Manager must create instances for each domain 630 and evaluate individual datapoints to form instances of datasets and components 640. This enables the system to know exactly which domain instance is having a problem. For example, if you have five web servers, and one of them begins to fail, it is important to know which instance, on which host, the failure will occur. It is also important to understand what other domain instances have relationships with that instance. Relationships are very important in analysis, and must be created by the data collectors or the Management Server 650. For an example of relationships by hosts 660, if Database B fails, Web Server A will not be affected, because it writes to Database A only. However, if Database B fails, Web Server B will not be able to perform its functions.

Figure 7:
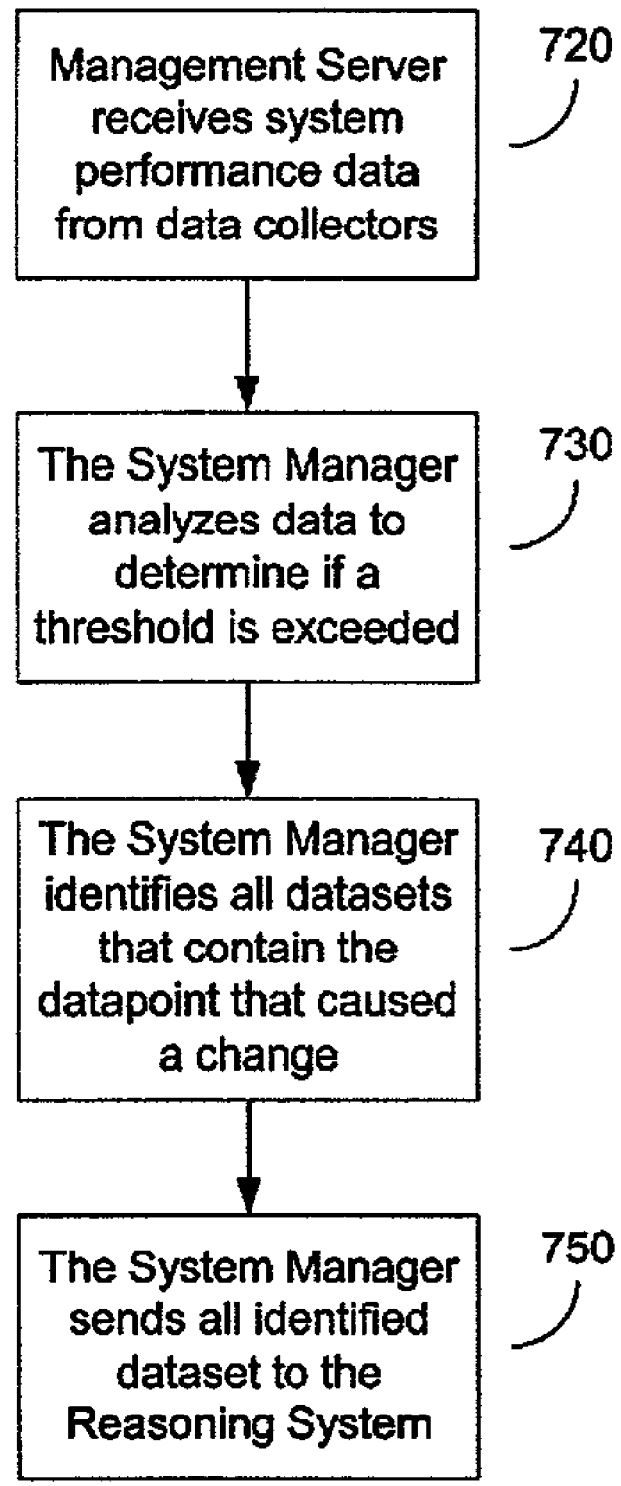
FIG. 7 shows the sub-steps of the evaluate thresholds and trigger analysis step of FIG. 3.

Turning now to FIG. 7, FIG. 7 shows the sub-steps 700 of the evaluate thresholds and trigger analysis step 330 of FIG. 3. The data collectors send data to the System Manager 720 where datapoint values are compared with predefined thresholds 730. For example, if a datapoint state has changed from Fair to Critical, the System Manager looks in the repository to identify all datasets that contain the datapoint that caused the change and sends all of the identified datasets to the Reasoning System for analysis 750.

Figure 8:
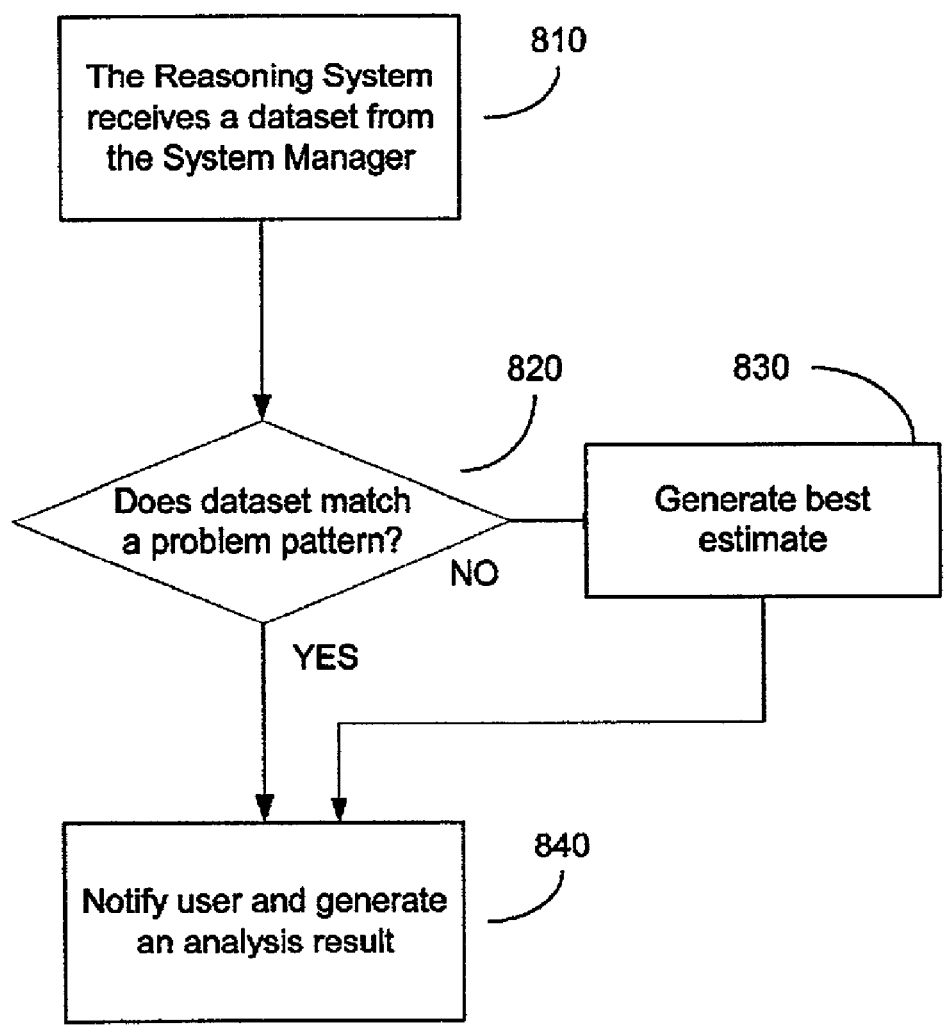
FIG. 8 shows the sub-steps of the correlation and data analysis step of FIG. 3.

Turning now to FIG. 8, FIG. 8 shows the sub-steps 800 of the prediction and data analysis step 340 of FIG. 3. When the Reasoning System receives a dataset from the System Manager for analysis 810, the Reasoning System performs pattern recognition to determine if the pattern in the dataset matches a defined problem or condition in its knowledge base 820. If it finds a match 820, the Reasoning System notifies the end user in the form of an analysis result 840. If it does not find a match 820, a best estimate is generated 830 and the user is notified 840.

Figure 9:
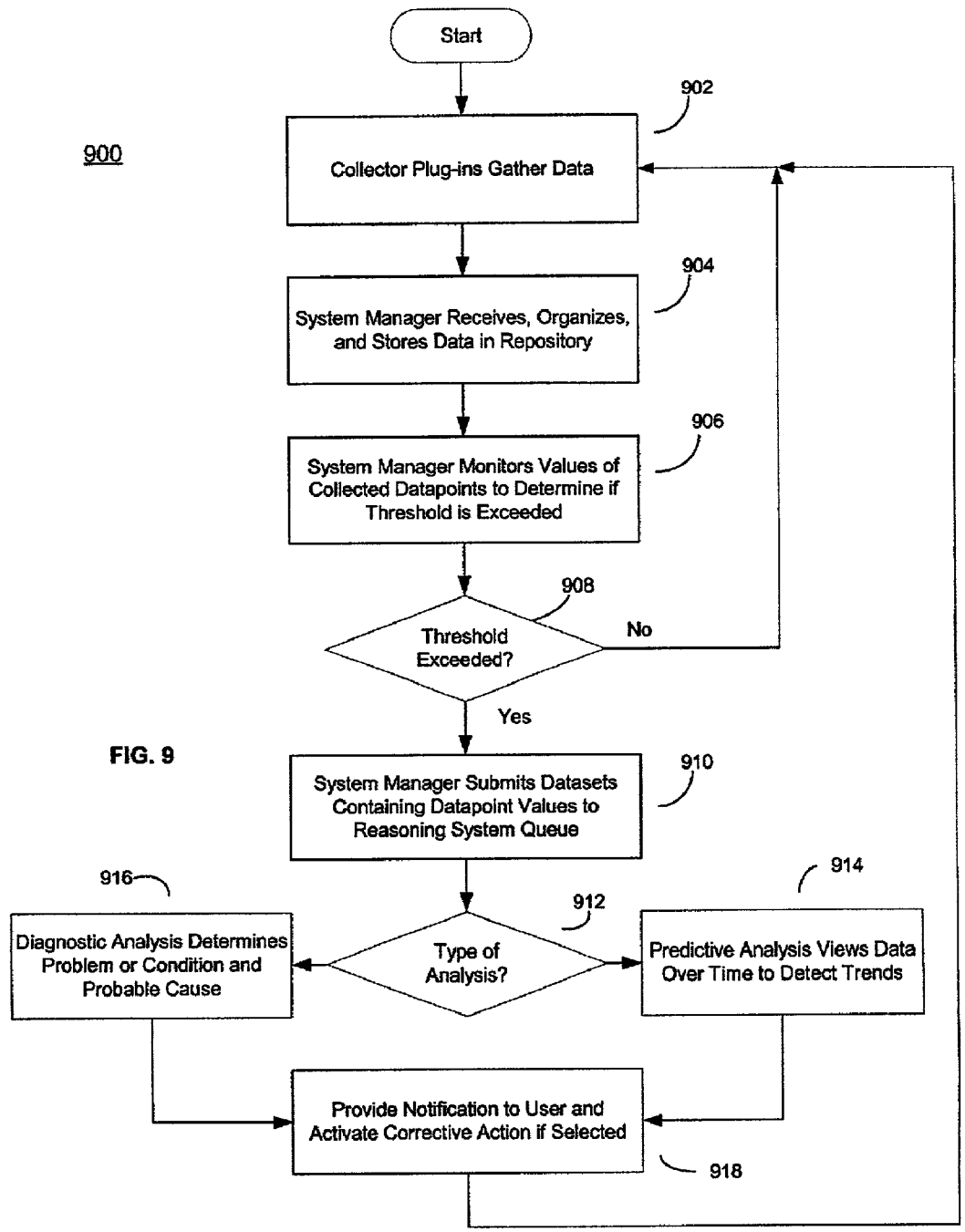
FIG. 9 shows a flow diagram for an operating data analysis process after system set up.

Turning now to FIG. 9, FIG. 9 shows a flow diagram 900 for a data analysis process after a system has been set up and is operating. The collector plug-ins gather data 902 from each host and domain in a host business system, and the System Manager receives, organizes, and stores the collected data in a repository 904 as datapoints. As it receives the data, the System Manager stores and analyzes the values of the collected datapoints to determine if a threshold has been exceeded 906. If a datapoint exceeds a threshold 908, the System Manager submits all datasets that contain the datapoint to a queue for a Reasoning System 910. If a datapoint does not exceed a threshold 908, the data gathering step 902 is repeated. This analysis occurs quickly. The reasoning system determines what type of analysis is needed and submits the dataset to either a diagnostic engine or a predictive analysis engine 912. If submitted to the diagnostic analysis engine, the diagnostic analysis engine analyzes the problem or condition and determines probable cause 916. If submitted to the predictive analysis engine, the predictive analysis engine views the data over a period of time to detect trends 914. If one of the analysis engines discovers a problem or trend, it generates an analysis result and a notification, for example, either a probable cause of a problem notification or an estimated time to failure or impact notification, which is provided to a user 918. If corrective action has been selected for the particular problem or condition, a corrective script will run automatically or by user initiation on the host that is experiencing the problem 918. The reasoning system diagnoses problems and conditions, and makes predictions based on a threshold value for datapoints. For example, if a datapoint measure CPU utilization, the threshold determines whether CPU utilization is low (good), medium (fair), high (warning), or very high (critical). This distinction is important in data analysis because it determines how the condition is diagnosed. When a reasoning system analyzes a dataset, it may not generate an analysis result. It only generates an analysis result when a data pattern matches information in a knowledge base with a high degree of certainty.

The invention is a complete object-oriented system. The System Manager and other server elements instantiate data objects representing business applications, databases, and operating system resources that are stored in an Object Oriented Database Management System (OODBMS). Using XML representations, the System Manager and other server components instantiate these objects in the Repository. The database architecture contains two types of objects, definition objects and instance objects. In object-oriented terms, definition objects are similar to a class and instance objects are similar to an instance. Definition objects provide a common place to describe instance objects and to store their attributes. TABLE 1 describes the type of instance objects and their corresponding definition objects.

TABLE 1

| Instance Object | Definition Object | Description |
| --- | --- | --- |
| Domain | DomainDef | Domains define a distinct area of an environment being monitored: web server, operating system, database, and business application. A domain groups related components. |

TABLE 1-continued

| Instance Object | Definition Object | Description |
| --- | --- | --- |
| Component | ComponentDef | A component is a part of a domain in which data is being tracked. For example, a file system, system process, and log file are all components. In the data model, components are modeled as a group of datapoints belonging to the same area, performing a common function, or sharing common attributes. |
| Datapoint | DataPointDef | Datapoints are the monitored characteristics of components or component instances. File system datapoints might include total disk space, amount of free space, and amount of used space on the disk. |

Turning to FIG. 10, FIG. 10 shows an example 1000 of a DomainDef definition 1010 for an operating system. This example also contains examples of ComponentDef structures 1020, 1040 and DataPointDef structures 1030, 1050, 1060, 1070. This example illustrates the relationships between DomainDef, ComponentDef and DataPointDef definition structures defined in XML.

Datasets are logical collections of datapoints stored within the Repository. The datapoints in each dataset can belong to any number of components, and any number of datasets can contain the same datapoint. The groupings are based on various types of relationships between the components that contain the datapoints. For example, because database functionality is affected when a file system runs low on space, a dataset might group datapoints that monitor file system space within a domain, in addition to datapoints that monitor Oracle database activity in the same domain. Each dataset represents an attribute that the Reasoning System uses for analysis. The description of a dataset is contained in an object called DatasetDef in the database. The DatasetDef object lists all the components and their datapoints, and defines the dataset. TABLE 2 shows an example dataset.

TABLE 2

| Domain | Component | Datapoint |
| --- | --- | --- |
| Operating system | File system | Percent Used |
| Oracle | Tablespace | Status |
| Application | Server | Status |

This dataset contains three datapoints. Since datapoints are essentially fixed attributes of a component, it is the component that determines how to build a dataset. Therefore, in this example, there are three distinct components and each has a datapoint.

The DatasetDef describes which components and datapoints are included in a dataset, in addition to links to the type of analysis appropriate for the dataset. A dataset instance (referred to simply as a dataset) is an instance of the DatasetDef. A dataset instance is created from the DatasetDef when the system has all the necessary components and relationships to create it. The rules for selecting the components that become part of a dataset are a crucial part of the process. A dataset can contain components that belong to one domain or multiple domains. Hence, the system is capable of performing cross-domain analysis. A dataset instance contains the following information:

Name—the name of the corresponding DatasetDef followed by a unique identifier;

Component List—the list of component instances that are a part of the dataset; and Datapoint List—a list of datapoint instances that comprise the dataset.

The data pattern is an ordered list of datapoints and their current values or states. This pattern is generated whenever analysis occurs on a dataset.

Turning to FIG. 11, FIG. 11A shows an example of a DataSetDef definition file for Oracle_SqlRunTimeDiagnostic 1100, FIG. 11B shows an example of a DataSetDef definition file for OS_FileSysDiskSpacePredictor, and FIG. 11C shows an example of a DataSetDef definition file for OS_VirtMemoryPredictor. These XML files contain examples of DataSetDef structures 1110, 1140, 1170, DsComponentDef definition structures 1115, 1145, 1175, and DsDataPointDef definition structures 1120, 1122, 1124, 1150 1180. These special definition structures may be specified by XML files that specify information necessary to create a dataset. DsComponentDef is a description of the component to be selected for a dataset. DsDataPointDef is a description of the datapoint of a component with its information on how to trigger and analyze. Relationships between components are needed to build a dataset instance. The System Manager, Reasoning System, and other server components use special definition files to group and analyze data. When it receives data, the System Manager checks the templates and special definition files for relationships among the components and instances that are being monitored. The System Manager then maintains those relationships as it builds new datasets or adds to existing datasets in the Repository. The System Manager also maintains the owner-member relationships established in the collection system. This results in datasets that provide a snapshot of the client environment. Dataset definitions are created using definition objects, which define or describe other objects in the database. A user may create a dataset definition without instantiating it. If components match this dataset definition, a dataset may be created at a later time.

These special definition files called DatasetDef include DsComponentDef and DsDataPointDef definition structures. The DatasetDef is a special definition file that describes a dataset and contains the following information:

Name—the name of the DatasetDef; the name of the dataset instance is based on this name; and List of DsComponentDef—a list of references to component definitions with additional dataset specific information.

The DsComponentDef is a special definition structure that contains the following information:

ComponentDef—a pointer to the component definition used in the dataset;

List of DsDataPointDef structures—a subset of the datapoints from the component definition that are needed for the dataset;

List of child DsComponentDef objects—components that must be specifically related to this component; and Parent DsComponentDef object.

A DsComponentDef may contain an optional set of one or more constraints:

Host—constrains the possible candidates for this component based on its host;

Domain—the domain instance constraint; and

Component—the component instance constraint.

The dataset definition tree is defined hierarchically and includes two types of DsComponentDef files: root and child. The root DsComponentDef structures are at the top level and the child DsComponentDef structures have a parent DsComponentDef. Root structures are specified when a relationship between two component types is not envisioned ahead of time. Child level structures are specified when relationships are known. This hierarchical structure allows for construction of both simple and complex datasets.

The DsDataPointDef is a special definition structure that contains the following information:

DatapointDef—a pointer to the datapoint definition used in the dataset;

TriggerFlag—specifies whether this datapoint triggers analysis;

TriggerThreshold—the threshold state (good, fair, warning, critical) at which analysis is triggered;

AnalyzeFlag—whether this datapoint participates in analysis; and

Label—used to uniquely identify the datapoint.

Datapoints that have the analyze flag are used to create the pattern for analysis. Those that do not are used for information purposes and to identify the context for the dataset. For example, there could be a datapoint that identifies the name of the file system that is failing. TriggerFlag identifies datapoints that may trigger analysis. Trigger threshold states are used to determine the state at which analysis must be triggered.

Turning to FIG. 12, FIG. 12 shows an example of a scenario definition structure 1200 based on cases 1210, 1220 and diagnostic/predictive analysis 1230, 1240. During the capture knowledge step 310 of FIG. 3, the extension environment will generate a scenario definition file along with the dataset and the engine definition files. Together, they constitute the captured knowledge in the system. The extension environment uses scenario definition files to identify cases and provide information to the user when a particular case is found by the reasoning system. The dataset definition file contains information about the datapoints and components that make up the dataset. The engine definition file contains information about the module that will operate on the dataset and generate the scenarios specified in the scenario definition file. A scenario may contain the following information: an ID to identify the scenario uniquely; a description of the case; suggested short term and long term solutions; a category for identifying the area of impact; severity of the case; information about where corrective actions should be performed; and flags determining things such as whether the scenario should result in a notification by pager.

Turning now to FIG. 13, FIG. 13 shows an example of a relationship template file 1300. The relationship template example contains two components 1310, 1320 having a relationship between them. FIG. 13 contains two relationship templates with constraints on the owner and member components. Relationship Templates are XML definition files that define relationships. Relationship Templates can also define relationships among components. The System Manager, analysis engines, and other server components use templates to group and analyze data. When the System Manager receives datapoints extracted from two components, it checks the template to determine if a relationship exists. It then uses the relationships to group datapoints within the Repository. When it receives data, the System Manager checks the templates and special definition files for relationships among the components and instances that are being monitored. The System Manager then maintains those relationships as it builds new datasets or adds to existing datasets in the Repository. The System Manager also maintains the owner-member relationships established in the collection system. This results in datasets that provide a snapshot of the client environment. Dataset definitions are created using definition objects, which define or describe other objects in the database. You can create a dataset definition without instantiating it. If components match this dataset definition, a dataset may be created later.

Relationships are the dependencies, interactions, and working associations among the domains and component instances that are being monitored. Relationships connect two or more components as being, belonging, or working together. Components often have relationships with one another; for example, a word processing application may depend on the printer connected to a particular host in order to print, and therefore establishes a relationship. The relationship between components is very important when creating individual datasets. When building a list of associated datapoints, the server looks for these relationships. For example, if the printer and spooler are related to each other and there is a dataset that contains datapoints from both, only datapoints from the related printer and spooler are used. This is crucial to the problem determination that is based on this relation. If the printer is down, only the spooler that is associated with the printer is affected. The System Manager instantiates datasets based on relationships. As the System Manager collects, stores, and analyzes data from the system, it checks for relationships that exist between the various elements of the business enterprise. A relationship exists when one component relies on another component in order to function. The Collector plug-ins use these types of relationships to determine what data to extract. The Collector plug-ins normally extract relationship data during configuration and initialization, rather than during the normal collection interval. In other words, the Collector plug-ins typically send data about relationships only when something has changed (is re-configured) and when the system starts. Relationships link any two components; however, the components themselves may belong to any domain. The system supports the dependency relationship between components. That is, Component A depends on Component B for its operation. Relationships are crucial to instantiating a dataset. Relationships may be specified in the following ways: discovery by plug-in and relationship templates. A Collector plug-in can discover or create a relationship based on knowledge it has about the domain or knowledge that the user has provided through configuration. Templates are XML definition files that define relationships that are created by the System Manager instead of Data Collectors. Templates can also define relationships among components. When the System Manager receives datapoints extracted from two components, it checks the template to determine if a relationship exists. It then uses the relationships to group datapoints within the Repository. Relationship templates allow the designer to specify a rule to create a relationship. The rule contains a regular expression string that can be used to choose the individual components in a relationship. The rule may also contain a flag that indicates that the two entities have something in common. The following attributes can be specified: host where owner or member component resides; domain (instance) to which the owner or member component belongs; component name of the owner or member; require that both components are from the same domain; and require that both components are on the same host. The server creates a relationship automatically when two components matching a relationship template are detected.

Turning now to FIG. 14, FIG. 14 shows an example of an engine definition file 1400 named "kbengine"1410. The engine definition file 1410 includes the ModuleDef Name "OS_FileSysDiskSpacePredictor"1420 and the ModuleDef Name "OS_VirtMemoryPredictor" 1430. The DataSetDef definition files for these modules are discussed above in regard to FIG. 11D and FIG. 11C. For the purpose of associating analysis with a dataset, the system uses the concept of an engine and module as illustrated in FIG. 14. An engine is a distinct entity that performs analysis. A module is a function within the engine that addresses a specific dataset. Newly created relationships and components are processed to determine if new datasets need to be instantiated. When a dataset contains a single component, any time a component meets the DsComponentDef criteria (that is, it must be an instance of the appropriate ComponentDef and meet all of the constraints specific to this DsComponentDef), a dataset instance is created. The dataset instance has a unique name based on the DataSetDef name. Datasets may be either single-level or multi-level datasets.

Figure 15:
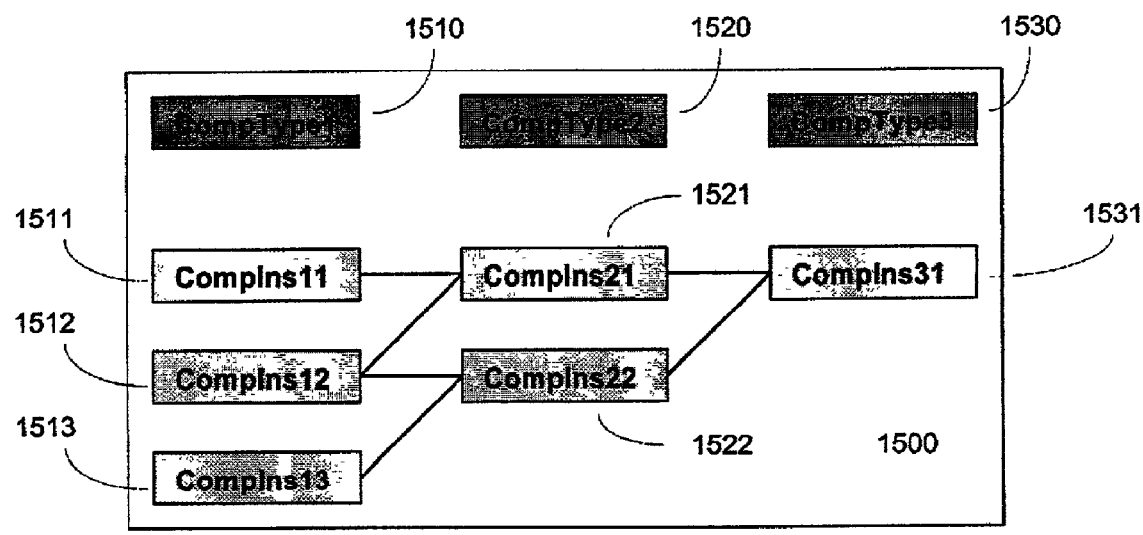
FIG. 15 shows an example of a single-level dataset.

Turning to FIG. 15, FIG. 15 shows an example of a single-level dataset 1500. A single-level dataset is where multiple component types are specified at the topmost level 1510, 1520, 1530. Here, the analysis begins whenever at least one relationship that matches the dataset becomes available. When two component types match the dataset definition and this list matches the entire list of components required, a dataset instance is created. Otherwise, the following criteria are used to search for additional top-level components.

1. If the ComponentDefs VicinityImpact is of type "System," implying that this component affects the entire system, all components of this type are searched for and categorized.

2. If the Component that has already been selected has a relationship with another component that matches this DatasetDef, this component is included in the category.

At the end of this search, a list of candidate components that may be included in the datasets is created. The system then creates a candidate dataset consisting of these components and sends them for further analysis. In choosing the candidate dataset, a combinatorial algorithm is used. If there are three components that match a particular dataset, then three candidate datasets are created. FIG. 15 indicates a scenario consisting of three component type instances: CompType1 1510, CompType2 1520, CompType3 1530. Below each component is a list of its instances and their relationship to other components (indicated by lines). The actual order of relationships does not matter. According to these rules, this specification yields the following datasets:

CompIns11 1511-CompIns21 1521-CompIns31 1531
CompIns12 1512-CompIns21 1521-CompIns31 1531
CompIns12 1512-CompIns22 1522-CompIns31 1531
CompIns13 1513-CompIns22 1522-CompIns31 1531

The same result occurs if CompType3 1530 has a VicinityImpact of "System" and has no relationship to any other component.

Figure 16:
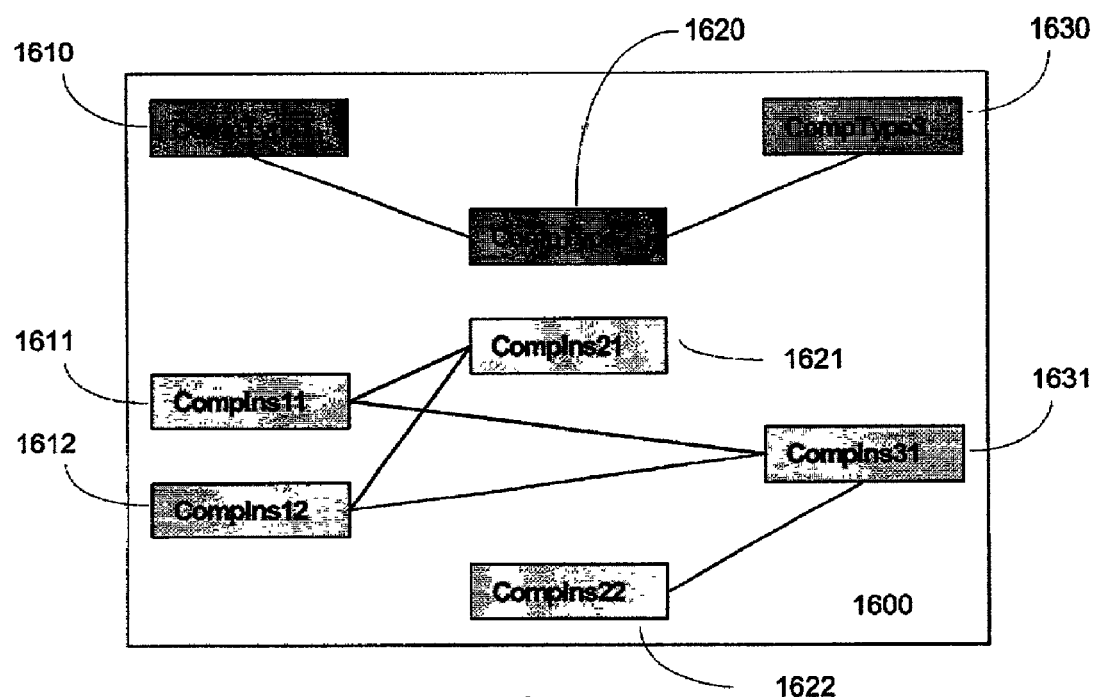
FIG. 16 shows an example of a multi-level dataset.

Turning now to FIG. 16, FIG. 16 shows an example of a multi-level dataset 1600. The multi-level dataset 1600 expands upon the single-level dataset, allowing multiple levels of components based on a parent-child connection. This enables specialization of relationships to particular components and the ability to have multiple component instances of the same type in the dataset. The top-level components 1610, 1620, 1630 work exactly as previously described for a single-level dataset. Once the top-level components are satisfied, the algorithm searches for any child components of the top-level component. In doing so, it looks at all the relationships of that particular component. FIG. 16 depicts a more complex scenario in which there are two top-level components: CompType1 1610 and CompType3 1630. Below each component is a list of its instances and their relationship to other components (indicated by lines). CompType2 1620 is a child of CompType1 1610 and CompType3 1630 in the dataset definition. On the instance side, CompIns11 1611 and CompIns12 1612 are related to CompIns21 1621. Further, CompIns31 1631 is related to CompIns22 1622. In this scenario, the following datasets are created:

CompIns11 1611-CompIns21 1621-CompIns31 1631-CompIns22 1622
CompIns12 1612-CompIns21 1621-CompIns31 1631-CompIns22 1622

This type of relationship has several benefits: it allows multiple instances of the same type of component to appear in the dataset; and it is possible to analyze the impact of a component and its sub-components in the same dataset. In the example, if CompType2 is in an operating system domain, it is possible to pinpoint the effect of a failure in the operating system more accurately.

Figure 17:
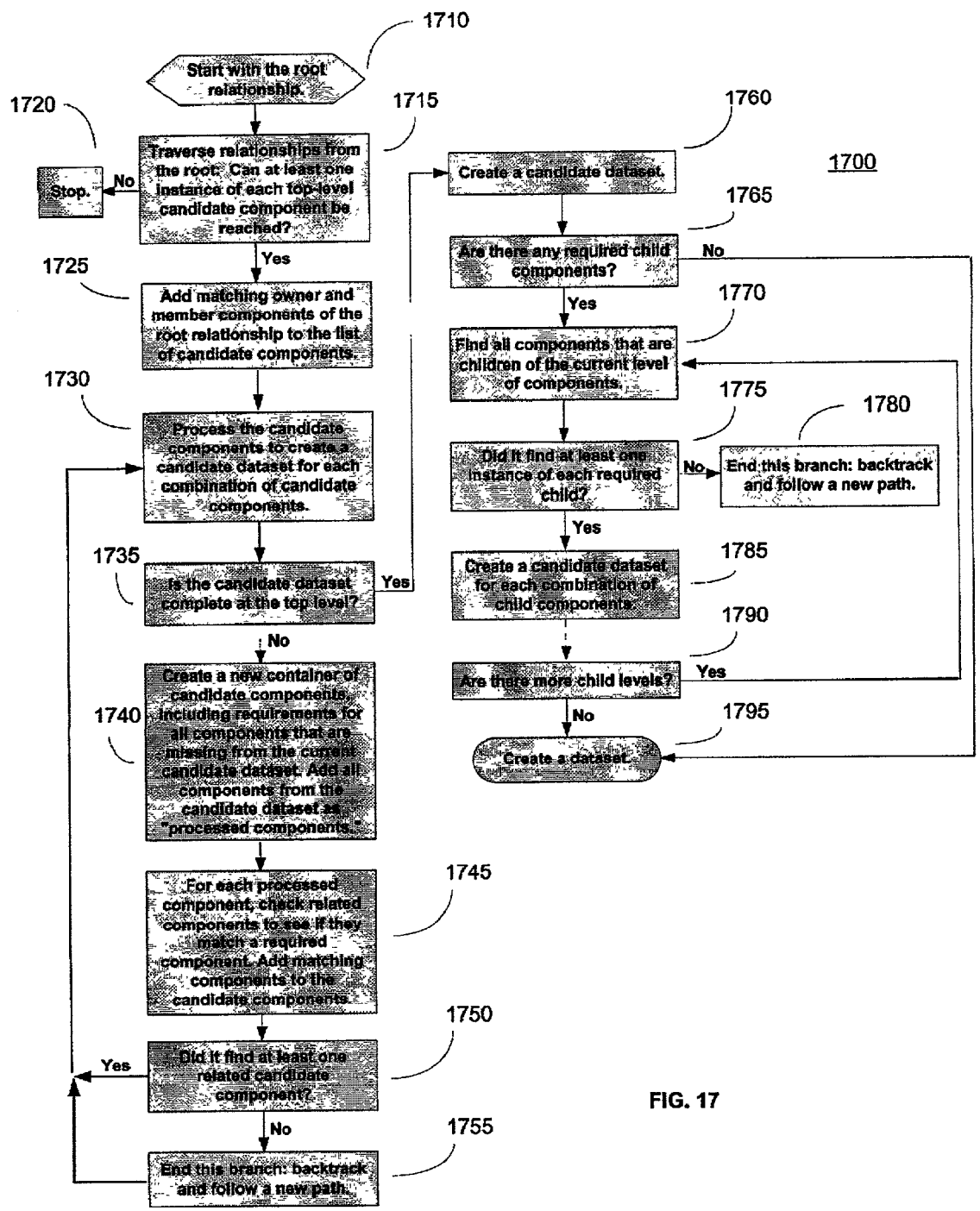
FIG. 17 shows a flow diagram of a dataset instantiation algorithm.

Turning to FIG. 17, FIG. 17 shows a flow diagram 1700 of a dataset instantiation algorithm. The dataset instantiation algorithm searches the graph of related components for particular subgraphs that meet the criteria for dataset instantiation. It applies elements of backtracking in its refinement portion and its search portion is similar to the iterative deepening algorithm. The algorithm to create a dataset is performed in several stages. When the algorithm initially starts, the system has already identified either one or two components that match the top-level components of the dataset or root relationships. Trivial rejection is the first stage in the process. A quick check of the relationships is performed to determine whether at least one instance of all the required top-level components may be reached 1715. This check follows the relationship graph to ensure that any component that should satisfy the dataset can be reached. If at least one top-level candidate cannot be found, the process is stopped 1720. The step of traversing relationships from a root 1715 does not account for all the possibilities, but does eliminate the need for further costly computation. System-wide components are ignored in this check. If at least one instance of each top-level candidate component can be reached 1715, owner and member components of the root relationship are added to the list of candidate components 1725. Candidate components are processed to create a candidate dataset for each combination of candidate components 1730. This process 1730 creates a path for each candidate dataset, which is evaluated one after the other. Before the algorithm proceeds, it performs a check to determine if the candidate dataset is complete at the top level 1735. That is, it looks for whether all components that are required to build a dataset are available. This commonly occurs if the dataset contains only one or two components. This check 1735 is also performed at the end of each iteration. The first step in the actual build starts with the top-level components. This build follows an iterative approach. At each iteration, the system builds a list of candidate components that match a specific component definition (ComponentDef) in the dataset 1740. For each processed component, related components are checked to see if they match a required component, and matching components are added to the candidate components 1745. For example, in the single-level hierarchy diagram, if CompIns11 (see FIG. 15, 1511) was already in the dataset, this step would yield CompIns21 (see FIG. 15, 1321) and CompIns22 (see FIG. 15, 1322). For each iteration, the system only collects components of the same type in a category 1745. At the end of each iteration, the system either has a list of possible components or none. If there is a list of possible components 1750, the algorithm takes each possible component and creates another candidate dataset 1730. It then recursively applies the same algorithm to find additional components. If a trail leads to an incomplete dataset 1750, the process backtracks to the previous step and follows another trail 1755. If none of the trails match, then no datasets are instantiated. Otherwise, it creates as many datasets as possible. If a component has a system-wide impact, the algorithm executes a global search of all possible components that can match this component type. Each of these components becomes a candidate. System-wide impact components may only occur at the top-most level. If a candidate dataset is complete at the top level 1735, a child-level build is initiated by creating a candidate dataset 1760. The child-level build is easier than the top-level build since the system already has a list of all top-level components. For each child, the algorithm evaluates all the relationships of the parent component for any children that can satisfy the dataset. If there are no required child components in a candidate dataset 1765, the process is complete and a dataset is created 1795. If there are required child components 1765, all components that are children of the current level of components are found 1770. When found, the same iterative process as in the top-level build is used to fill the dataset. If at least one instance of each required child is not found 1775, the branch is ended and the process backtracks and follows another path 1780. If at least one instance of each required child is found 1775, a candidate dataset is created for each combination of child components 1785. If there are no more child levels 1790, a dataset is created 1795. If there are more child levels 1790, the process is repeated by finding all components that are children of the current level of components 1770. Certain criteria can be used to resolve child components without explicit relationships. These include belonging to the same host, domain, or other grouping. If a DsComponentDef has constraints, the component-specific constraint check is applied whenever a component is considered for inclusion in the dataset. Once the process has filled all required components, system then creates a dataset instance 1795. The system takes datapoints from the candidate components and creates a list, ensuring there are no duplicates with other dataset instances. A dataset instance is created for each unique set of components that meets all of the criteria for dataset instantiation.

The system executes triggering and analysis as outlined in FIG. 9. The triggering and data analysis process follows these steps:

1. The Collector plug-ins gather data for each host and domain in the system. For example, each domain-specific Collector plug-in collects information for each host: database, operating system, Web server, and application data.

2. The System Manager receives the collected data, organizes it, and stores it in the Repository as datapoints.

3. As it receives data, the System Manager monitors the values of the collected datapoints to determine if a threshold has been reached. If a datapoint reaches a threshold, the System Manager triggers analysis.

4. The Reasoning System determines what type of analysis is needed and triggers the appropriate analysis engine: the Diagnostic Engine or the Predictive Analysis Engine. Analysis occurs very quickly 5. The analysis engine determines if there is a problem or condition.

Triggering is the process in which the arrival of a datapoint can trigger analysis on the dataset. Triggering is always evaluated for components that have been marked as "Triggerable" in the DatasetDef. These components must specify the threshold at which triggering should take place in mnemonic terms: Good, Fair, Warning, and Critical. For example, if the datapoint measures CPU utilization, the thresholds determine whether CPU utilization is low ( good), medium ( fair), high ( warning), or very high ( critical). This distinction is important in data analysis because it determines how the condition is diagnosed. There are currently two types of triggers: value trigger and state trigger. A value trigger is a trigger that activates analysis whenever a datapoint meets or exceeds a threshold. For example, if the CPU utilization was set to trigger analysis whenever it was in the warning stage, either warning or critical will trigger analysis. A state trigger is activated whenever the state of a component changes. This reduces, to a large extent, the amount of analysis that is performed when the datapoint value is always at a triggered state, such as when the CPU is always at warning. The state trigger operates whenever the state of a datapoint changes from being non-triggered to triggered. The state trigger also operates when a datapoint changes state and another datapoint in the same dataset is in a triggered state. For example, if the threshold was set to critical and the previous state was warning, this triggers whenever the threshold changes to critical. Once a dataset is in the triggered state, any change in the state of any other analyzed datapoint causes analysis. This ensures that the analysis accurately reflects the problem being encountered in the real system.

In order to perform analysis, a pattern is extracted from a dataset. The pattern is a list of datapoints and their corresponding states. A pattern for the single-level hierarchy may look like Critical-Fair-Warning. This pattern is then analyzed by the corresponding engine to determine if a certain condition has been met. If a condition has been met, then a result may be created or further datapoint values created in the system. When analysis is triggered for a specific dataset, this dataset is placed in a queue for the engine. The engine then receives a message telling it to look in the queue. The engine can then retrieve datasets from the queue and analyze each of them.

Figure 18:
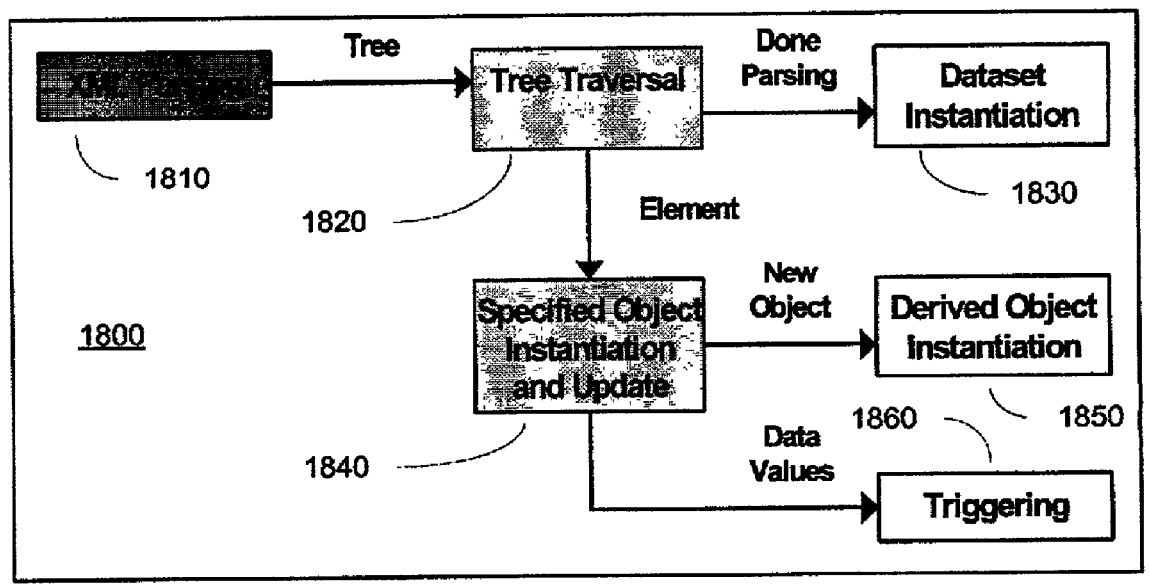
FIG. 18 depicts elements of the System Manager architecture.

Turning to FIG. 18, FIG. 18 depicts elements of the System Manager architecture 1800. These elements implement the processing of data model that defines the persistent objects that the rest of the Management Server uses for data storage, analysis, and reporting. The System Manager 1800 is the focus for new information to flow into the Management Server, serving as the translator for data from the Collectors and updating the server persistent store or triggering other server entities as necessary. The System Manager consists of the following modules represented in FIG. 18. The XML Parsing element 1810 of the System Manager 1800 parses XML into a Tree representation. XML input may come from either the communication API or files. The Tree Traversal element 1820 consists of traversing the Tree and taking actions on specific elements. The Specified Object Instantiation and Update element 1840 creates or updates objects specified by a given element 1820. These objects correspond to domains, components, datapoints, relationships and data values from a collector domain update or definition objects as part of database initialization. The Derived Object Instantiation element 1850 processes the newly created components to determine if new server relationships need to be created. The Triggering element 1860 evaluates dataset and datapoint trigger conditions given the value of updated datapoints. The Dataset Instantiation element 1830 processes the newly created relationships and components to determine if new datasets need to be instantiated.

The invention claim is:

1. A method for correlating and diagnosing system performance data, comprising:
   capturing knowledge about system behavior;
   deploying the captured knowledge as baseline system behavior files;
       evaluating monitored system performance datapoints against the baseline system behavior files to determine whether a change in state has occurred;
   identifying, in response to a change in state determination, datasets containing one or more datapoints causing the change in state;
   performing real-time prediction and diagnostic analysis on the datasets that have changed states;
   notifying a user of a prediction and diagnostic analysis result;
   wherein the deploying step further comprises:
       loading XML definition files that characterize system behavior in terms of the scenarios, modules and datasets;
   receiving system domain, component and datapoint information;
   creating relationships between components; and
   evaluating and creating domain and component instances in each domain to form instances of datasets.

2. The method of claim 1, wherein the capturing step comprises:
   defining problems to be solved;
   creating datasets that correspond to the defined problems;
   constructing problem scenarios;
   associating data patterns with the problem scenario ases; and
   generating XML definition files that characterize system behavior in terms of the scenarios modules and datasets.

3. The method of claim 1, wherein the deploying step further comprises characterizing the captured system behavior knowledge as XML files.

4. The method of claim 1, wherein the evaluating step comprises:
   receiving system performance datapoints from data collectors;
   comparing the datapoints against a threshold value to determine a state of the datapoints;
   analyzing the received performance daaapurnb when a slate changes or exceeds a threshold;
   correlating the datapoints that exceeded the threshold values with stored datasets in the baseline system behavior flies to identify related datasets; and
   sending the correlated datasets to a reasoning system for prediction and diagnostic analysis.

5. The method of claim 1, wherein the pefforming step comprises:
   receiving correlated datasets by a reasoning system;
   performing prediction and diagnosis analysis by the reasoning system to determine it the received datasets match problem patterns in a knowledge base; and
   generating an analysis result based on analysis of the recieved datasets and problem patterns.

6. The method of claim 5, wherein the generating step provides an analysis result chat identifies a problem and a probable cause of the problem.

7. The method of claim 5, wherein the generating step provides an analysis result that predicts an incipient system component failure.

8. The method of claim 5, wherein the generating step provides a best estimate of a problem and probable cause of the problem.

9. A computer-readable medium containing instruction for controlling a computer system to carry out the steps of claim 1.

10. A computer system for correlating and diagnosing system performance data, comprising:
    an extension environment comprising means for capturing knowledge about system behavior;
    a system manager comprisng:
    means for deploying the captured knowledge as baseline system behavior files;
    means for evaluating monitored system performance datapoints against the baseline system behavior files to determine whether a change in state has occurred
    means, responsive to a change in state determination, for identifying datasets comprising one or more datapoints causing the change in state;
    a reasoning system comprising:
        means fur performing real-time prediction and diagnostic analysis on the datasets;
        means for notifying a user of a prediction and diagnostic analysis result;
    means for parsing XML files into a tree representation;
    means for traversing the tree representation and taking actions on specific tree elements;
    means for creating and updating domain, component, datapoint
    relationship, and dataset objects specified by a given tree elements;
    means for instantiating derived objects by proeesing newly created components to determine if new relationships need to be created;
    means for instantiating datasets by processing newly created relationships and components to determine if new datasets need to be instantiated; and
    wherein the means for deploying comprises loading XML definition files that characterize system behavior in terms of scenarios, modules and dataset; receiving system domain, component and datapoint information; creating relationships between components; and evaluating and creating domain and component instances in each domain to form instances of datasets.

11. The system of claim 10, wherein the capturing means comprises:
    problems to be solved;
    datasets that correspond to the defined problems;
    problem scenarios;
    data pattern modules with the problem scenarios; and
    XML definition files that characterize system behavior in terms of the scenarios, modules and datasets.

12. The system of claim 10, wherein the means for deploying further comprises XML files that characterize the captured system behavior knowledge.

13. The system of claim 12, wherein the system behavior knowledge is stored in a repository, encapsulated in XML tiles and built into the engine and module.

14. The system of claim 10, wherein the means for deploying further comprises XML definition files that characterize system composition and behavior in terms of:
the scenarios, modules and datasets;
domain information;
datapoints and components; and
relationships between components.

15. The system of claim 10, wherein the means for evaluating comprises:
system performance data from data collectors;
domain, components, datapoint and relationship instances from received data;
relationships based on pre-defined templates based on component instances;
datasets based on a relationships and component instances;
evaluated performance data to determine if a threshold value is exceeded;
identified dataset containing datapoints that exceed a threshold value; and
a reasoning system for receiving the identified datasets.

16. The system of claim 10, wherein the means for performing real-time prediction and diagnostic analysis comprises:
a reasoning system for receiving identified datasets;
a prediction engine and a diagnostic engine in the reasoning system for determining if the received dataset matches a problem pattern in a knowledge base; and
an analysis result from the prediction engine and diagnostic engine.

17. The system of claim 16, wherein the analysis result identifies a problem, a probable cause of the problem, and suggested solution.

18. The system of claim 16, wherein the analysis result predicts an incipient system component failure.

19. The system of claim 16, wherein the analysis result is a best estimate of a problem and a probable cause of the problem.

20. A method for correlating and diagnosing system performance data, comprising:
capturing knowledge about system behavior;
deploying the capture knowledge as baseline system behavior flies;
evaluating monitored system performance datapoints against the baseline system behavior files to identify datasets that have changed states;
performing real-time prediction and diagnostic analysis on the datasets that have changed states;
notifying a user of a prediction and diagnostic analysis result;
parsing XML files into a tree representation;
traversing the tree representation and taking actions on specific tree elements;
creating and updating domain, component, datapoint, relationship, and dataset objects specified by a given tree element;
instantiating derived objects by processing newly created components to determine if new relationships need to be created;
instantiating datasets by processing newly created relationships and components to determine if new datasets need to be instantiated; and
wherein the deploying step further comprises loading XML definition files that characterize system behavior in terms of scenarios, modules and datasets; receiving system domain, component and datapoint information; creating relationships between components; and evaluating and creating domain and component instances in each domain to form instances of datasets.

21. The method of claim 20, wherein the capturing step comprises:
defining problems to be solved;
creating datasets that correspond to the defined problems;
constructing problem scenarios;
associating data patterns with the problem scenario cases; and
generating XML definition files that characterize system behavior in terms of the scenarios modules and datasets.

22. The method of claim 20, wherein the deploying step further comprises characterizing the captured system behavior knowledge as XML flies.

23. The method of claim 20, wherein the evaluating step comprises:
receiving system performance datapoints from data collectors;
comparing the datapoints against a threshold value to determine a state of the datapoints;
analyzing the received performance datapoints when a state changes or exceeds a threshold;
correlating the datapoints that exceeded the threshold values with stored datasets in the baseline system behavior files to identify related datasets; and
sending the correlated datasets to a reasoning system for prediction and diagnostic analysis.

24. The method of claim 20, wherein the performing step comprises:
receiving correlated datasets by a reasoning system;
performing prediction and diagnosis analysis by the reasoning system to
determine if the received datasets match problem patterns in a knowledge base; and
generating an analysis result based on analysis of the received datasets and problem patterns.

25. The method of claim 24, wherein the generating step provides an analysis result that identifies a problem and a probable cause of the problem.

26. The method of claim 24, wherein the generating step provides an analysis result that predicts an incipient system component failure.

27. The method of claim 24, wherein the generating step provides a best estimate of a problem and probable cause of the problem.

28. A computer-readable medium containing instruction for controlling a computer system to carry out the method of claim 20.

29. A computer readable storage medium containing a data structure for storing objects for correlating and diagnosing system component performance data, comprising:
domain objects that identify distinct areas of a system environment, wherein the domain objects are defined by DomainDefXML definition structures that include a type, category, and attributes of component and datapoint objects;
component objects that identify parts of the domains of the system environment, wherein the component objects are defined by ComponentDefXML definition structures that include a type and attributes of datapoint objects;
datapoint objects that identify monitored characteristics of system components, wherein the datapoint objects are defined by DataPointDefXML definition structures that contain a name and attribute;

relationship templates for connecting two or more components related to one another, wherein the relationship templates are defined by RelationTemp definition structures that include identification of related components;

scenario objects that identify possible causes for the problem, wherein the scenario objects are defined by the Scenario definition structures that include the problem description, probable cause and suggested solutions; and module objects that encapsulate stored knowledge.

30. The data structure of claim 29, wherein a system manager instantiates the objects in a repository from XML files.

31. The data structure of claim 29, wherein:
domain objects comprise one or more component objects;
component objects comprise one or more datapoint objects; and
dataset objects comprise one or more component objects and one or more datapoint objects.

32. The data structure of claim 29, wherein dataset objects contains datapoints belonging to one or more component objects.

33. The data structure of claim 29, wherein the relationship templates specify a rule to create relationships between components, the relationship template including the following attributes:
Type for identifying method of creation;
OwnerDomainType for identifying owner domain type;
OwnerCompType for identifying owner component type;
MemberDomainType for identifying member domain type;
MemberCompType for identifying member component type;
OwnerComp for identifying owner component instance;
MemberComp for identifying member component instance;
OwnerDomainInst for identifying owner domain instance;
MemberDomainInst for identifying member domain instance; and
flags to specify that owner and member should be pert of same domain, same component and same host.

34. The data structure of claim 29, further comprising an engine template for associating analysis with a dataset, the engine including one or more modules that address a specific dataset.

35. A computer readable storage medium containing a data structure for storing objects for correlating and diagnosing system component performance data, comprising:
domain objects that identify distinct areas of a system environment, the domain objects defined by DomainDefXML definition structures that include a type, category, and attributes of component and datapoint objects;
component objects that identify parts of the domains of the system environment, the component objects defined by ComponentDefXML definition structures that include a type and attributes of datapoint objects;
datapoint objects that identify monitored characteristics of system components, the datapoint objects defined by DataPointDefXML definition structures that contain a name and attributes;
dataset objects that comprise logical collections of datapoint objects, the dataset objects defined by DataSetDefXML definition structures that include attributes of components objects and datapoint objects;
relationship templates for connecting two or more components related to one another, the relationship templates defined by RelationTemp definition structures that include identification of related components;
scenario objects that identify possible causes for the problem, the scenario objects defined by the Scenario definition structures that include the problem description, probable cause and suggested solutions;
module objects that encapsulate stored knowledge; and
wherein the DatasetDef objects comprise a DataSetDef name; and a list of DsComponentDef objects wherein each object includes a pointer to the component definition used in the dataset; and subset of DsDataPointDef objects included in the component definitions needed in the dataset; a liot of child DoComponentDof objects related to this component; a parent DsComponentDef object; and wherein the DsDataPointDef objects include a pointer to a DataPointDef object used in the dataset; a trigger flag for specifying whether this datapoint triggers analysis; a trigger threshold at which point analysis is triggered; an analyze flag for specifying whether this datapoint participates in analysis; and a label to uniquely identify the datapoint.

36. The data structure of claim 35, wherein the trigger threshold is selected from the group consisting of good, fair, warning and critical.

37. The data structure of claim 35, wherein the DsComponentDef object further includes a constraint selected from the group consisting of possible candidates for this component based on its host, the domain instance, and the component instance.

38. The data structure of claim 35, wherein a system manager instantiates the objects in a repository from XML files.

39. The data structure of claim 35, wherein:
domain objects comprise one or more component objects;
component objects comprise one or more datapoint objects; and
dataset objects comprise one or more component objects and one or more datapoint objects.

40. The data structure of claim 35, wherein dataset objects contains datapoints belonging to one or more component objects.

* * * * *

UNITED STATES PATENT AND TRADEMARK OFFICE
CERTIFICATE OF CORRECTION

PATENT NO. : 7,237,023 B2  Page 1 of 1
APPLICATION NO. : 10/063232
DATED : June 26, 2007
INVENTOR(S) : Cody Menard et al.

It is certified that error appears in the above-identified patent and that said Letters Patent is hereby corrected as shown below:

In Claim 10, column 22, line 28 of the Patent, change "fur" to --for--.

In Claim 10, column 22, line 40 of the Patent, change "proeesing" to --processing--.

In Claim 15, column 23, line 19 of the Patent, change "dataset" to --datasets--.

In Claim 33, column 25, line 41 of the Patent, change "pert" to --part--.

In Claim 35, column 26, line 25 of the Patent, change "liot" to --list--.

Signed and Sealed this

Twenty-eighth Day of August, 2007

JON W. DUDAS
*Director of the United States Patent and Trademark Office*